United States Patent [19]

Kahn

[11] Patent Number: 5,581,678
[45] Date of Patent: Dec. 3, 1996

[54] SYSTEM AND METHODS FOR AUTOMATED GRAPHING OF SPREADSHEET INFORMATION

[75] Inventor: Philippe R. Kahn, Scotts Valley, Calif.

[73] Assignee: Borland International, Inc., Scotts Valley, Calif.

[21] Appl. No.: 546,859

[22] Filed: Oct. 23, 1995

Related U.S. Application Data

[63] Continuation of Ser. No. 425,665, Apr. 17, 1995, Pat. No. 5,461,708, which is a continuation of Ser. No. 103,483, Aug. 6, 1993, abandoned.

[51] Int. Cl.[6] .................................................. G06F 15/62
[52] U.S. Cl. .................................................. 395/140
[58] Field of Search ..................................... 395/155, 156, 395/157, 161, 140; 345/133, 134, 135

[56] References Cited

U.S. PATENT DOCUMENTS

| | | | |
|---|---|---|---|
| 4,974,170 | 11/1990 | Bouve et al. | 369/518 |
| 5,182,796 | 1/1993 | Shibayama et al. | 395/156 |
| 5,278,951 | 1/1994 | Camacho et al. | 395/140 |
| 5,303,146 | 4/1994 | Amminato et al. | 364/401 |
| 5,317,686 | 5/1994 | Salas et al. | 395/157 |
| 5,359,724 | 10/1994 | Earle | 395/425 |
| 5,375,201 | 12/1994 | Davoust | 395/161 |

FOREIGN PATENT DOCUMENTS 0569133   4/1993   European Pat. Off. .

OTHER PUBLICATIONS

Quattro Pro., version 4.0, User's Guide, Chapter 13 Building Graphs, pp. 343–404, 1992.

*Primary Examiner*—Phu K. Nguyen
*Attorney, Agent, or Firm*—John A. Smart

[57] ABSTRACT

An electronic spreadsheet system of the present invention includes an intelligent graphing module for automatically selecting a graph type based on a user's own data. Methods are described for determining the level of complexity present in a user's data and for automatically selecting a preferred graph type based on that determined complexity. The system includes a preferred interface for receiving selections from the user indicating an information set (e.g., a block of contiguous or non-contiguous spreadsheet cells) to visualize graphically.

1 Claim, 22 Drawing Sheets

SYSTEM AND METHODS FOR AUTOMATED GRAPHING OF SPREADSHEET INFORMATION

This is a continuation application of application Ser. No. 08/425,665 filed Apr. 17, 1995, now U.S. Pat. No. 5,461,708 which is file wrapper continuation application of application 08/103,483 filed Aug. 6, 1993, now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of information processing by digital computers and, more particularly, to the processing and presentation of information in graphic form by application programs, particularly electronic spreadsheets.

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modeling tools: the accountant's columnar pad, pencil, and calculator. In some regards, spreadsheet programs are to those tools what wordprocessors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visual calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-left hand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. In this fashion, cell references can serve as variables in an equation, thereby allowing precise mathematical relationships to be defined between cells. The structure and operation of a spreadsheet program, including advanced functions such as "@functions" and macros, are documented in the technical, trade, and patent literature. For an overview, see e.g., Cobb, D., *Using 1-2-3*, Que corp., 1985; and Campbell, M., *Quattro Pro 4.0 Handbook*, 4th Ed., 1992. The disclosures of each of the foregoing references are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what if" scenarios. After a set of mathematical relationships has been entered into a worksheet, the spread of information can be recalculated using different sets of assumptions, with the results of each recalculation appearing almost instantaneously. Performing this operation manually, with paper and pencil, would require recalculating every relationship in the model with each change made.

A particular feature of electronic spreadsheets is the ability to view data in graphic form—to visually inspect important trends and characteristics of one's data. Consider, for instance, a user who has created a spreadsheet storing a year's worth of sales figures for various product lines. Suppose the user desires the sales data to be presented graphically, so that the user can, say, easily determine the peak sales months for each product. Conventional spreadsheet systems include a multitude of graph types for this very purpose. The user would proceed to select the data cells of interest and then pick a desired graph type for his or her data.

A problem exists, however. The user has no formal training in graph theory and is, in fact, quite bewildered by the vast selection of graph types. And to make matters worse, the user has not had an opportunity to master the user commands necessary for choosing among the various graph types because, like most other users, the user has not had time to read the user manual. With conventional electronic spreadsheets, therefore, the user must not only understand which graph type is appropriate for his or her data, but the user must also master the user commands necessary for selecting a particular type from among the numerous types available. Finding conventional approaches daunting, therefore, most users simply accept whatever default graph type is provided by his or her system. Unfortunately for the user, the default graph type provided by the system is no more suited from revealing important trends and characteristics of the user's data than if the user had simply selected a graph type at random.

SUMMARY OF THE INVENTION

The system of the present invention includes an electronic spreadsheet having a graphing module for visually presenting a user's data. Methods and interface are provided by the system for automatically formatting a graph based on the contents and layout of user-selected information. In particular, the present invention includes methods for determining the level of complexity present in one's data and for selecting a preferred graph type based on the determined complexity. In this manner, the present invention allows a spreadsheet user to prepare sophisticated graphical presentations of his or her data rapidly, with minimal user input or knowledge.

In a preferred method of the present invention, a graph is created as follows. First, a user selects information cells of interest (e.g., a block of spreadsheet cells). Next, the system determines the level of complexity of the user-selected information. In a preferred embodiment, the system partitions the information into one or more data series (based on values contained within the cells); the partitioning can be done manually by the user if desired. The system then determines how many such series exist, and how many data points exist within each series.

The system assigns a relative complexity based on the number of data series and data points. For instance, if a data set includes just a single series having relatively few data points, the system of the present invention treats the data series as one of little complexity. If, on the other hand, a data set includes multiple data series and numerous data points within those series, the system treats the data set as one of greater complexity.

After determining the level of complexity present in the data set, the system of the present invention proceeds to select a graph type appropriate for the data set. A simple data set may take a simple graph type, such as a "pie" graph. For a complex data set, on the other hand, the system of the present invention selects a graph type better suited for more complex data sets. Data sets determined to have multiple data series, for instance, are presented with 3-D graph types (which allow the individual data series to be better visualized). If desired, the method may include examination of data types (e.g., from among fixed, scientific, currency, percent, date, time, text, and user-defined data types) and values (e.g., numeric positive and negative) for further aiding in graph/chart selection. For instance, a "pie" graph would be inappropriate for plotting both positive and negative values; an aggregation graph, however, would be suited for such a data set.

At the conclusion of the method, the user's data is plotted with the system-selected graph type; alternatively, an intermediate dialogue may be added to allow the user to accept or reject the system-selected graph type (or subset of preferred graph types selected from the set of available graph types).

GLOSSARY

Axis: Most graphs contain two axes: the x-axis runs horizontally along the bottom of the graph; the y-axis runs vertically on the left. The intersection of a point on each axis represents the data point.
Data Point: A single spreadsheet value displayed in a graph.
Label: In a spreadsheet, a label is a text entry. In a graph, labels are spreadsheet entries (of any type) that the user assigns to the graph to define plotted values.
Legend: A key displayed beside or beneath a graph that specifies the colors, marker symbols, or fill patterns for each series graphed.
Scale: The range of values associated with an axis.
Series: A set of cell values which are used for plotting a graph. For a simple graph, for example, each cell value is plotted sequentially as a data point on the graph.

DETAILED DESCRIPTION OF A PREFERRED EMBODIMENT

The following description will focus on the presently preferred embodiments of the present invention, which are embodied in an electronic spreadsheet system operative in an MS-DOS/Windows environment. The present invention, however, is not limited to any particular environment or any particular application. Instead, those skilled in the art will find that the system and methods of the present invention may be advantageously applied to a variety of different platforms, such as Macintosh, UNIX, NextStep, and the like. Moreover, the methods of the present invention will find application in other programs for managing information, such as database management systems and the like, particularly those where graphical presentation of information is desired. Therefore, the description of the exemplary embodiments which follows is for purposes of illustration and not limitation.

General System

A. Hardware

Figure 1A:
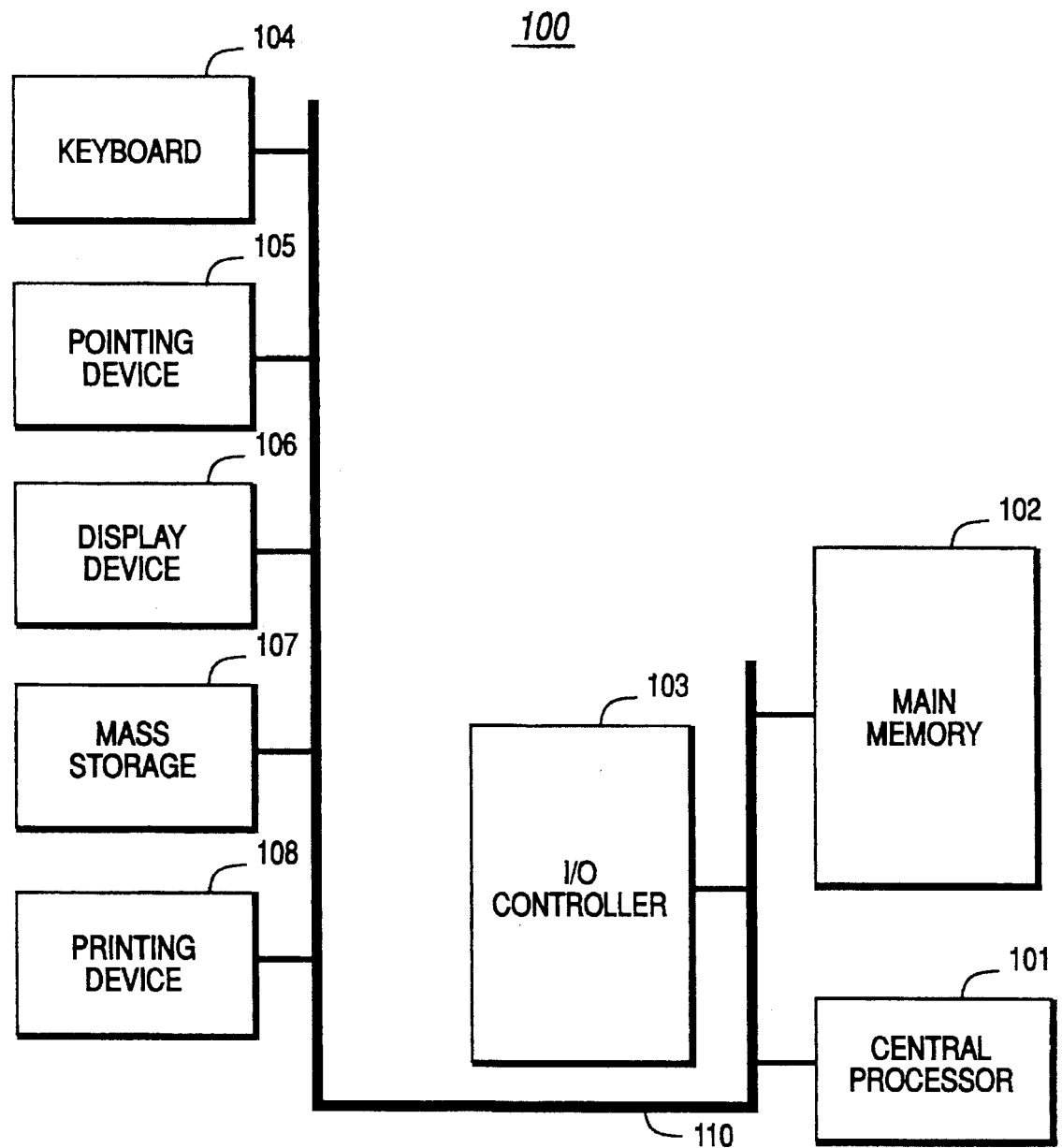
FIG. 1A is a block diagram of a computer system in which the present invention may be embodied.

As shown in FIG. 1A, the present invention may be embodied in a computer system such as the system 100, which includes a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including IBM of Armonk, N.Y.).

B. Software system

1. Overview

Figure 1B:
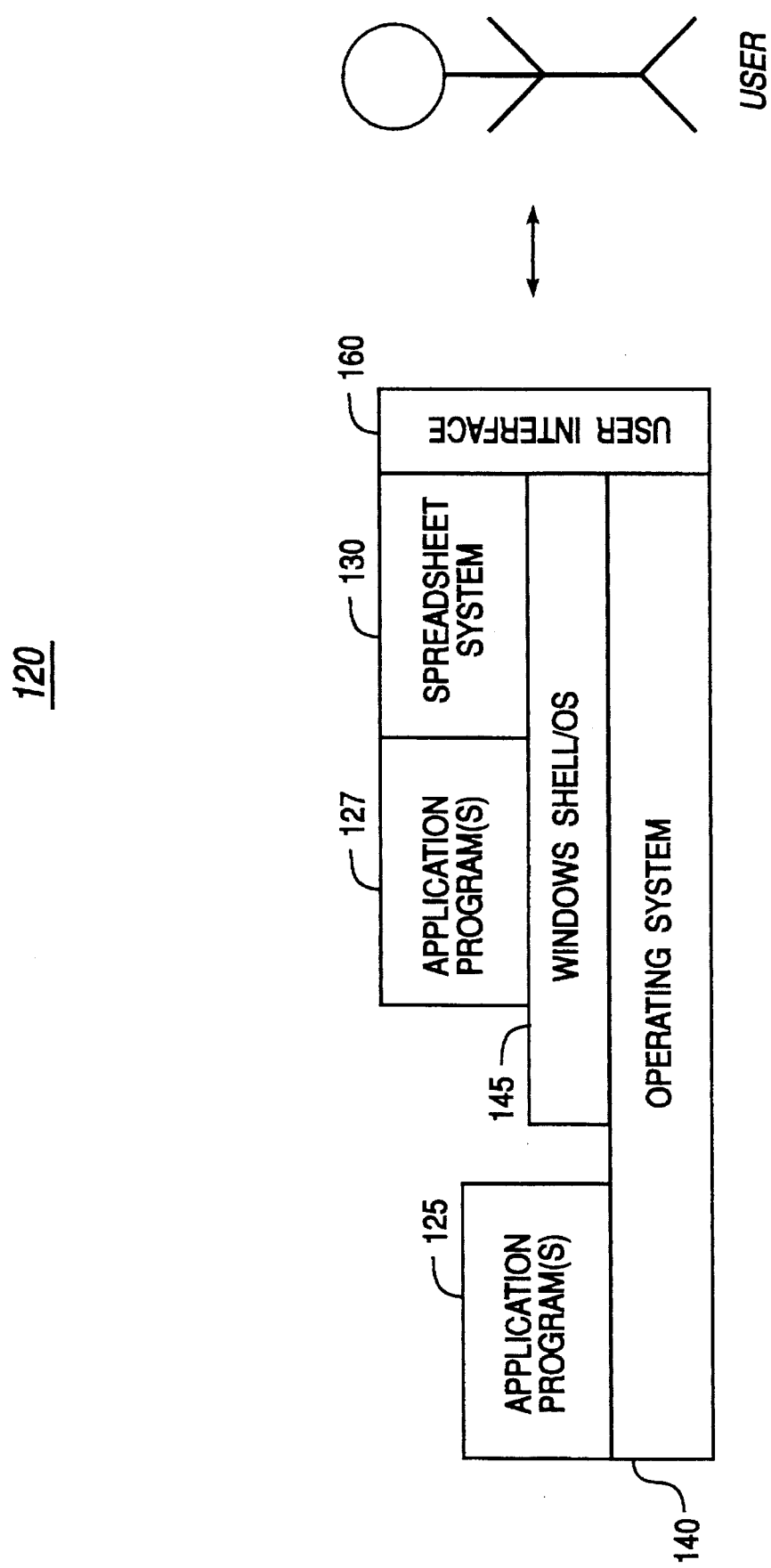
FIG. 1B is a block diagram of a software system of the present invention, which includes an operating system and optional application software, including an electronic, spreadsheet system.

Illustrated in FIG. 1B, a computer software system 120 is provided for directing the operation of the computer system 100. Software system 120, which is stored in system memory 102 and on disk memory 107, includes a kernel or operating system 140 and a windows shell 145. One or more application programs, such as application software 125, windows application software 127, and spreadsheet system 130, may be "loaded" (i.e., transferred from storage 107 into memory 102) for execution by the system 100.

2. Interface

System 120 includes a user interface 160 for receiving user commands and data; these inputs may then be acted upon by the system 100 in accordance with instructions from operating system module 140, windows shell 145, and/or application modules 125, 127, 130. The interface 160, which may support a character-based and/or a graphical user interface (GUI), also serves to display results, whereupon the user may supply additional inputs or terminate the session. In a preferred embodiment, operating system 140 includes MS-DOS, and windows shell 145 includes Microsoft® Windows; both are available from Microsoft Corp. of Redmond, Wash.

Figure 1C:
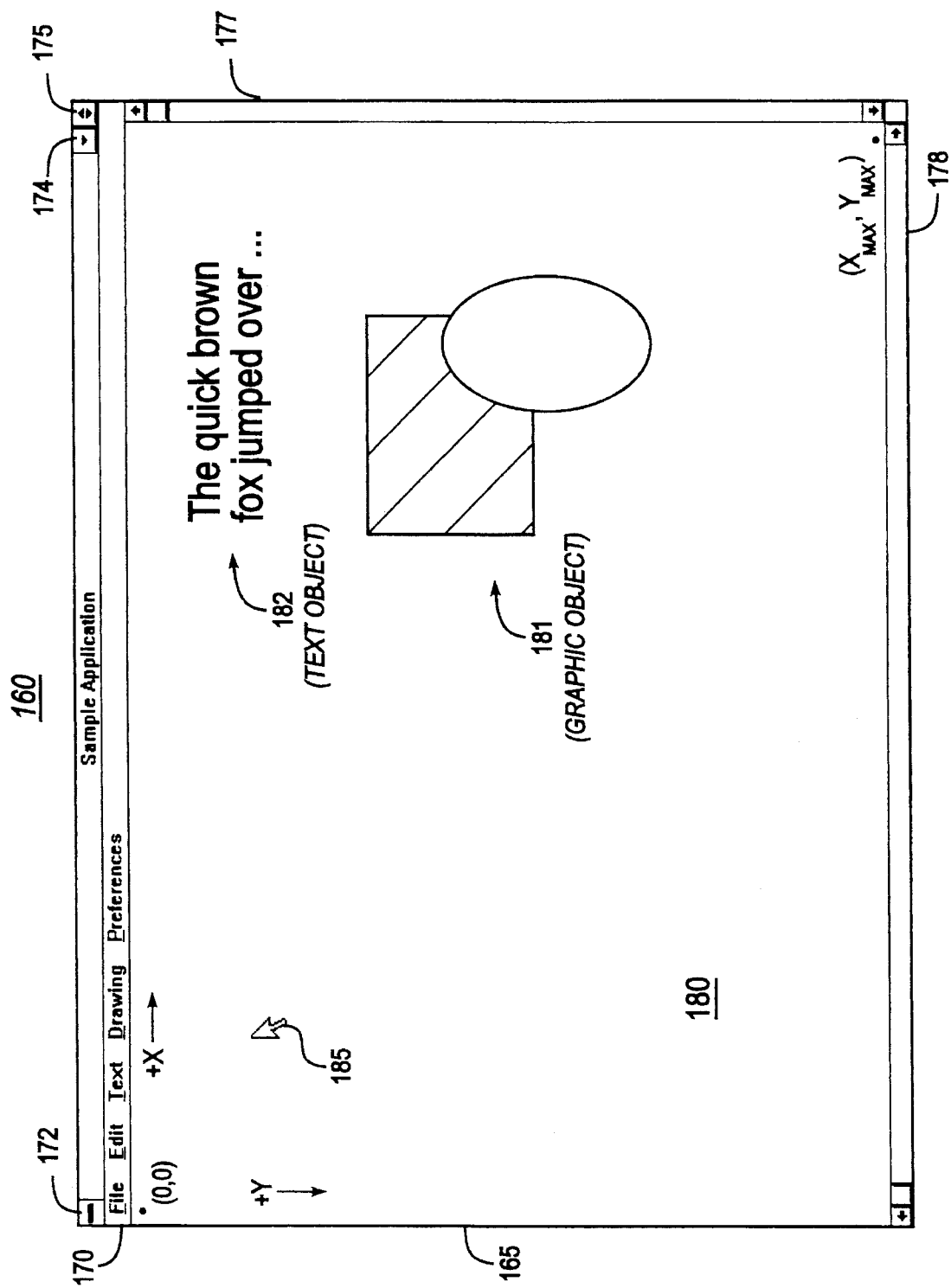
FIG. 1C is a screen bitmap illustrating a windows interface, such as employed by the system of FIG. 1B.

As shown in FIG. 1C, the interface 160 is most preferably a graphical user interface, provided by the application programs 125, 127 and spreadsheet system 130 operating under OS 140 and shell 145. The windowing interface or workspace 160 is a rectangular, graphical user interface for display on screen 106; additional windowing elements may be displayed in various sizes and formats (e.g., tiled or cascaded), as desired. At the top of window interface 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, window interface 160 may be closed, resized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computers of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference,* Microsoft Press, 1989. The general construction and operation of a GUI event-driven system, such as Windows, is also known in the art; see, e.g., Petzold, C., *Programming Windows,* Second Edition, Microsoft Press, 1990. The disclosures of each are hereby incorporated by reference.

Spreadsheet system

A. Overview

Figure 1D:
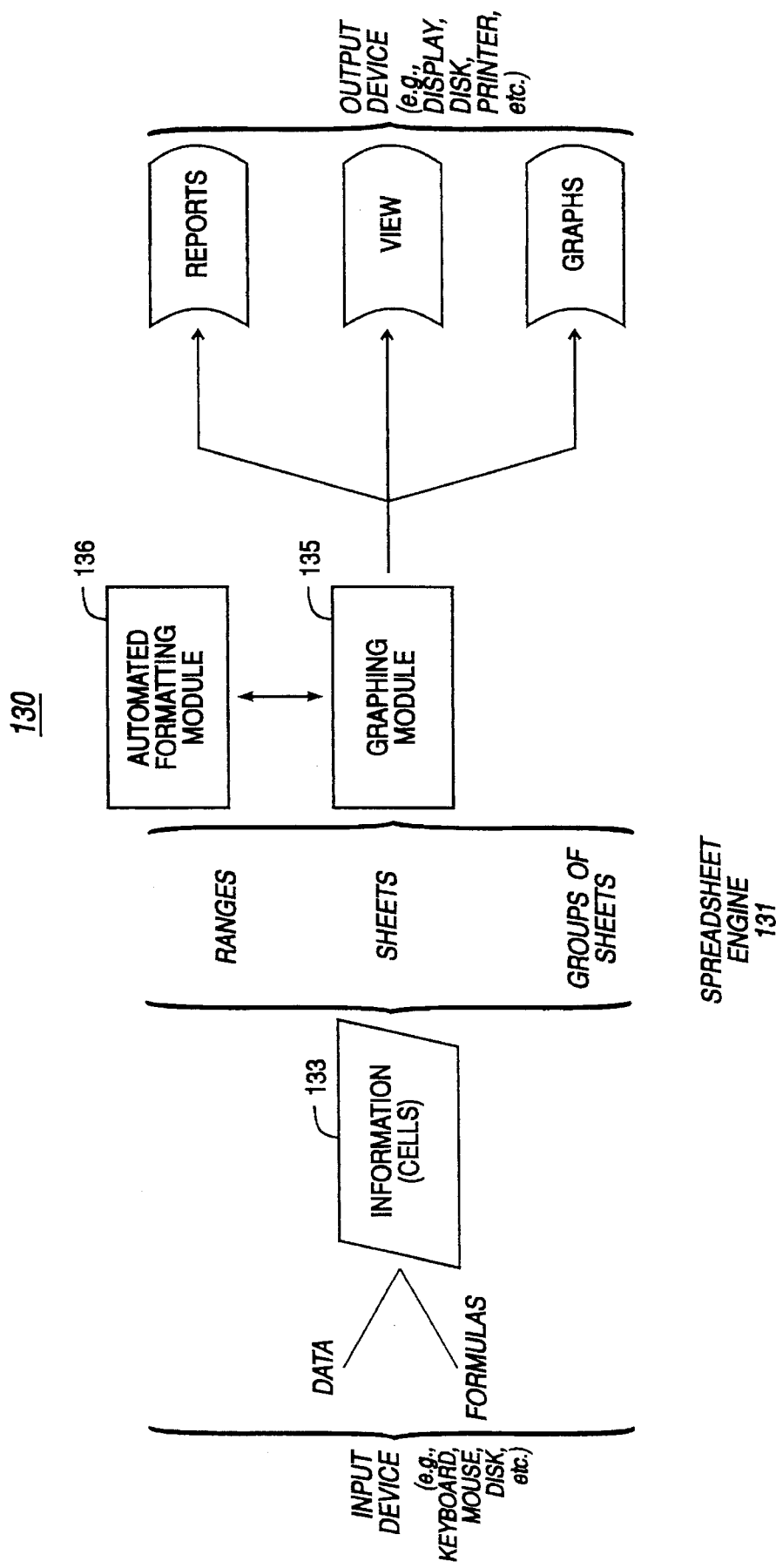
FIG. 1D is a simplified block diagram illustrating the basic architecture and functionality of the spreadsheet system of FIG. 1B.

The spreadsheet system 130 of the present invention is shown in further detail by a simplified block diagram of FIG. 1D. The system 130 includes a spreadsheet engine or module 131, a graphing module 135, and an automated formatting module 136. In operation, the system 30 maintains a matrix or "spread" of information cells 133, each cell being an atomic unit maintained and processed by the module 131. Data and formulas for the cells are received from an input device (e.g., keyboard, mouse, disk, and the like) for storage and processing by the system 130. From the cells, larger groupings, such as ranges (including blocks), sheets (including 2-D spreads), and groups of sheets (including 3-D spreads, linked sheets, and pages of sheets or "notebooks") may be defined.

The graphing module 135 provides the system 130 with the capability of displaying the spread of information visually, such as in various graphs or charts. Coupled to the graphing module 135 is the automated formatting module 136, which provides automated graphing with minimal user input. In this manner, the system 130 maintains built-in intelligence, whereby complex graphs may be easily constructed by the user, without knowledge of graph theory and without having to enter numerous commands.

In a preferred embodiment, the spreadsheet system 130 includes Quattro® Pro for Windows, available from Borland International of Scotts Valley, Calif. A description of the general features and user operation of system 130 is available in the documentation which accompanies Quattro® Pro for Windows.

B. Notebook interface

Figure 2A:
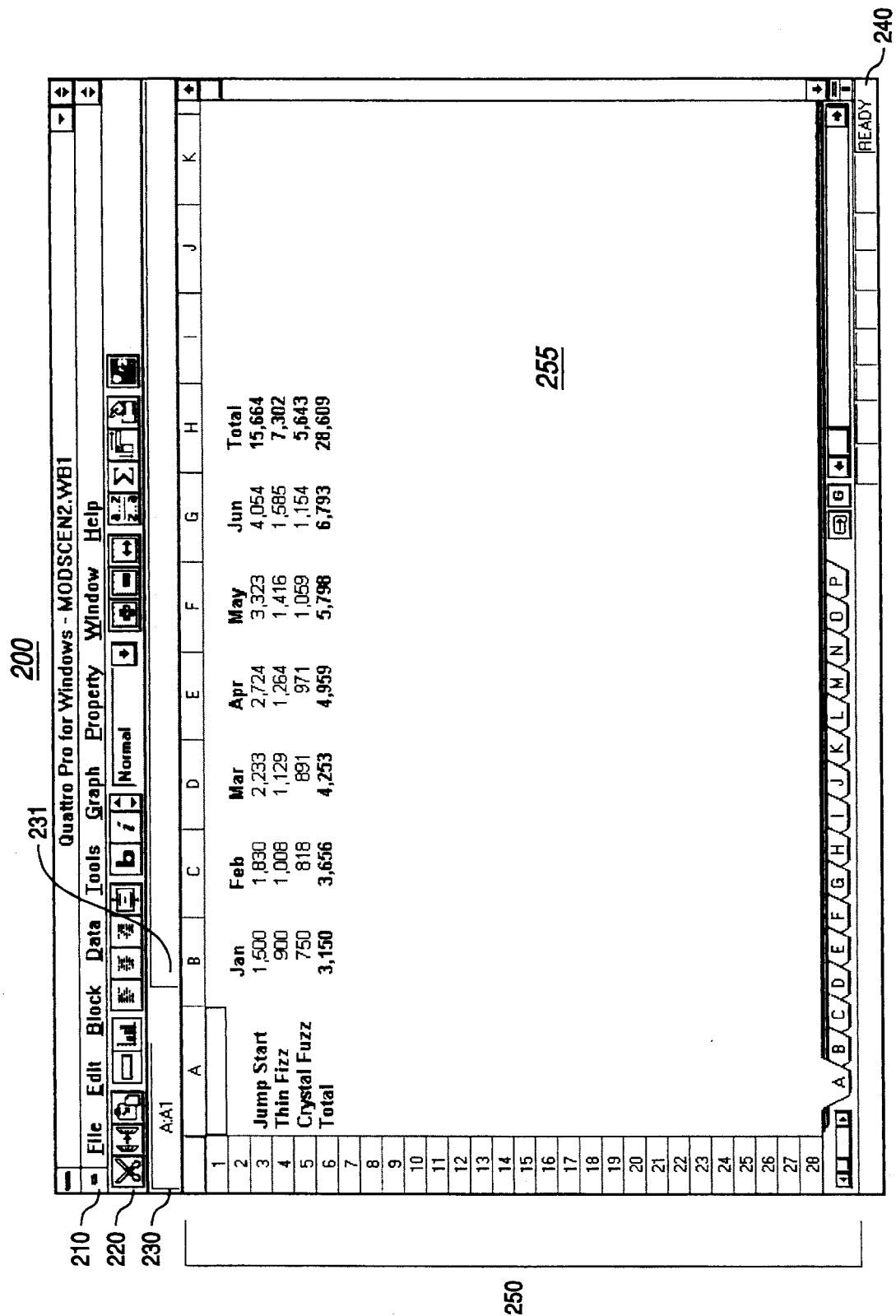
FIG. 2A is a screen bitmap illustrating a spreadsheet worksurface/interface of the present invention; the worksurface includes a sample spread of data monthly sales information for a fictitious line of products.

The spreadsheet system 130 includes a preferred notebook interface 200, shown in FIG. 2A, for receiving, processing, and presenting information, including alphanumeric as well as graphic information. Notebook workspace 200 includes a menu bar 210, a toolbar 220, a current cell indicator 230, an input line 231, a status line 240, and a notebook workspace 250. The menu bar 210 displays and invokes, in response to user inputs, a main level of user commands. Menu 210 also invokes additional pulldown submenus, as is known in windowing applications. Input line 231 accepts user commands and information for the entry and editing of cell contents, which may include data, formulas, macros, and the like. Indicator 230 displays an address for the current cursor (i.e., active cell) position. At the status line 240, system 100 displays information about the current state of the workbook; for example, a "READY" indicator means that the system is ready for the user to select another task to be performed.

Figure 2B:
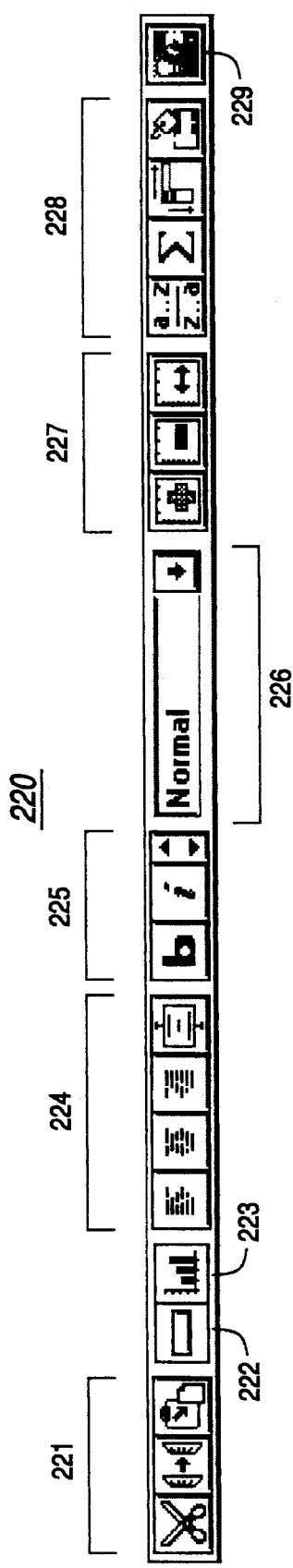
FIG. 2B is a screen bitmap illustrating a main toolbar provided by the interface of FIG. 2A.

The toolbar 220, shown in further detail in FIG. 2B, comprises a row or palette of tools which provide a quick way for the user to choose commonly-used menu commands or properties. In an exemplary embodiment, toolbar 220 includes cut, copy, and paste buttons 221, a power button tool 222, a graph tool 223, alignment buttons 224, font buttons 225, a style list 226 with pulldown, insert/delete and fit buttons 227, action (e.g., sort, sum, and the like) buttons 228, and an "expert" (tutor) button 229. The functions of these buttons are suggested by their names. For instance, buttons 221 cut, copy, and paste data and objects to and from Windows' clipboard. Tool 222 creates "powerbuttons" which allow a user to run spreadsheet macros; in a specific embodiment, powerbuttons appear as floating objects in a layer above spreadsheet cells. In a similar fashion, the graph tool 223 creates floating graphs that appear above spreadsheet cells; its function is described in greater detail below.

The notebook, which provides an interface for entering and displaying information of interest, includes a plurality of spreadsheet pages. Each page, such as page A (255) shown in notebook workspace 250, may include conventional windowing features and operations, such as moving, resizing, and deleting. In a preferred embodiment, the notebook includes 256 spreadsheet pages and one Graphs page, all of which are saved as a single disk file on the mass storage 107. Workspace 200 may display one or more notebooks, each sized and positioned (e.g., tiled, overlapping, and the like) according to user-specified constraints.

Each spreadsheet page, in turn, includes a 2-D matrix of spreadsheet cells, arranged as a rectangular grid comprising columns and rows. At the intersection of a column with a row is a single cell. A cell is a location where the user can enter data, formulas, and the like. Each cell is identified by an address determined by the column and row that contain it; in other words, the letter and number that make up the address are the cell's coordinates. Each column of cells is identified by a letter. Columns are marked with letters A–Z, then AA–AZ, BA–BZ and the like, up to IA–IV in a preferred embodiment. Each row of cells is identified by a number. Rows are marked with numbers ranging from 1 to 8192, in a preferred embodiment. Thus, for example, the cell in the top left corner is cell A1.

A highlighted rectangle or "cell selector" is provided for indicating a currently active one (i.e., the cell that is currently selected). This is the cell that will be affected by the next action, such as entering a value. The column containing the cell selector appears on the border in reverse video (or in a contrasting color on a color screen); the row containing the cell selector appears in reverse video or a contrasting color, depending on the monitor. The user can move the selector to any cell in the spreadsheet.

To enter information in the spreadsheet, the user typically moves the selector to the cell (e.g., with a screen cursor 185 or keyboard 102) the user wants and types in the entry. The characters typed in appear on the input line. When the entry is complete, one presses Enter or an arrow key (Right arrow, Left arrow, PgUp, or the like). The system 130 writes the value into the current cell, erasing any previous entry. If the user enters the data by pressing an arrow key, the selector moves in the appropriate direction.

Multiple cells may be selected for aggregate operations. In particular, a block is defined as a rectangular group of cells identified by the cell addresses of two opposite corners—usually the upper left and bottom right cells. In response to user movement signals from the pointing device 105, the cursor may be "dragged" across a range of cells for selecting a block, as is known in the art. Blocks may include contiguous or adjacent cells or ones which are non-contiguous. Once selected, blocks may be used in commands and formulas to act on several cells at once.

Figure 2C:
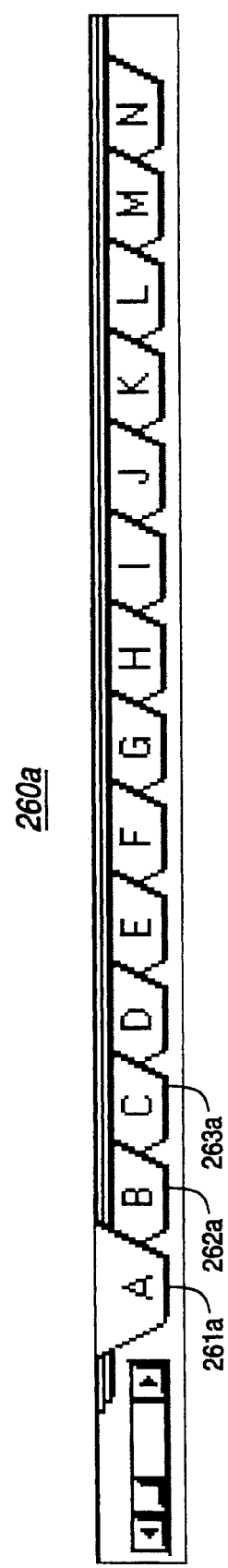
FIGS. 2C-D are screen bitmaps illustrating page tab members of the spreadsheet system for addressing cells and navigating among spreadsheet pages.
Figure 2D:
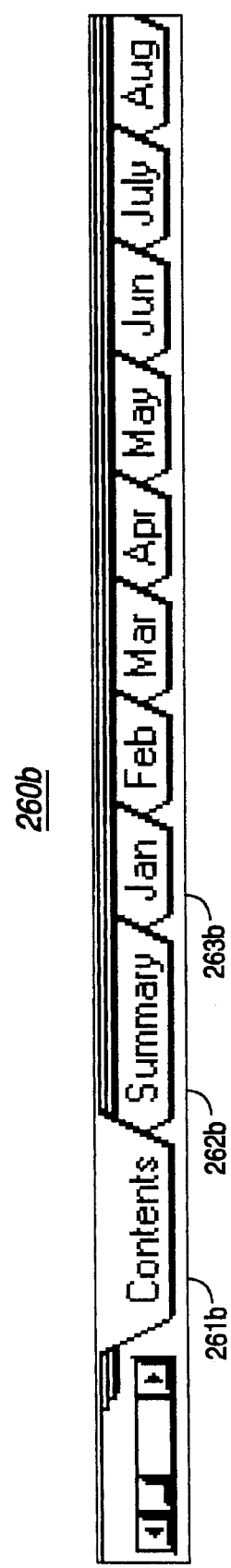

Since a notebook may include a plurality of 2-D spreadsheets or pages, the notebook interface includes an identifier for each page. As shown in FIGS. 2C–D, individual notebook pages are identified by page identifiers 260, preferably located along one edge of a notebook. In a preferred embodiment, each page identifier is in the form of a tab member (e.g., members 261a, 262a, 263a) situated along a bottom edge of the notebook. Each tab member may include representative indicia, such as textual or graphic labels, including user-selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

A general description of the features and operation of the spreadsheet notebook interface may be found in Quattro® Pro for Windows (*Getting Started, User's Guide and Building Spreadsheet Applications*), available from Borland International; additional description may be found in U.S. patent application Ser. No. 07/866,658, commonly owned by the present assignee.

Graphing module

A. Overview

The system 130 of FIG. 1C includes the graphing module 130 for creating graphs from spreadsheet data. A graph is a visual representation of information, typically numerical information; it presents a set of data as a picture. A graph may uncover a trouble spot, display a trend, illustrate a correlation between categories of data in a spreadsheet, or reveal features of the information not immediately apparent from examining the data cell-by-cell. The user can then return to the spreadsheet data for a look at the data behind the graph.

In an exemplary embodiment, a single graph can appear in three places in the system: in a separate graph window, as a floating graph in a notebook window, and as an icon on the Graphs page. Graphs preferably always exist (although not necessarily always displayed) on the Graphs page and in a graph window; floating graph display is optional. The user creates a floating graph directly on a spreadsheet page when he or she wants to view or print the graph on the same page as the data.

B. Creating a graph in a window

1. Standard mode

Figure 3A:
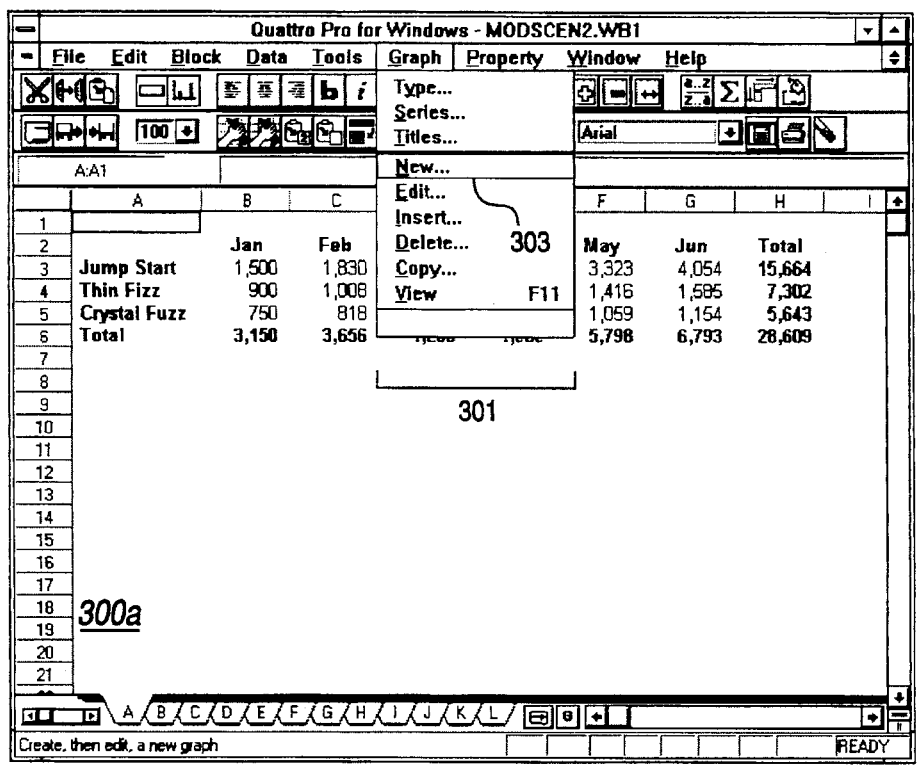
FIGS. 3A-D are screen bitmaps illustrating a first method and interface for graphing information (using the example of monthly sales information) in the system of the present invention.
Figure 3B:
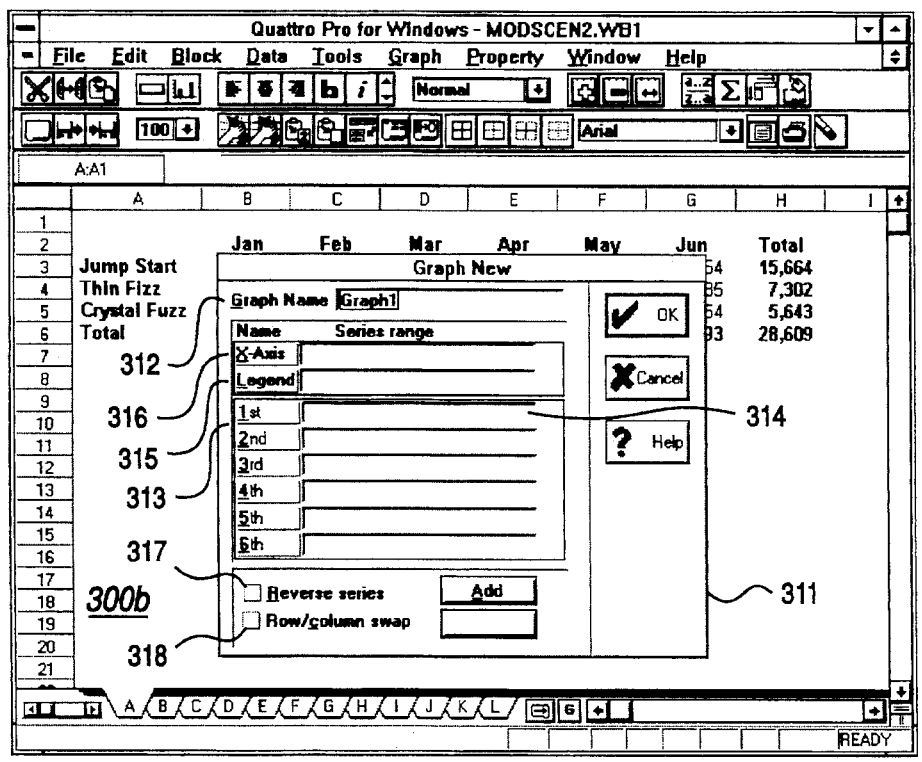

A standard method for creating graphs will now be described in greater detail with reference to FIGS. 3A–D; this method will serve as a reference point from which improved methods of the present invention for creating graphs may be better understood. To create a graph in a window, the user selects a Graph!New command 303 from graph submenu 301, as shown in FIG. 3A for the spreadsheet 300 (300*a*). A Graph New dialog box 311, shown in FIG. 3B, is displayed for the spreadsheet 300 (300*b*). Into the dialog box 311, the user enters a name for the graph in a Graph Name edit field 312; a default name may be accepted, if desired.

In the dialog 311, the user also assigns data blocks or "series" desired to be included in the graph. One can select a single cell, a contiguous block, or a non-contiguous block. In a preferred interface, the user clicks a Series button 313 to activate a point mode, which lets the user define a series by pointing to a block of cells on a spreadsheet page. As shown, Series buttons are labeled X-axis, Legend, 1st, 2nd, and so on, and appear on the left side of the dialog box. These are accompanied by edit fields which display the block coordinates of the series. To create a Legend Series, the user clicks (selects with the pointing device) a Legend button 315 and selects a block of cells on the spreadsheet to serve as labels (in a manner similar to above); thus, the Legend Series is a block of cells that provides labels indicating what each data series represents. To add labels to the X-axis, the user defines an X-axis Series by clicking an X-Axis button 316 and selecting a block of labels. In addition to defining a series block by pointing to the block (e.g., with a screen cursor), the user may type (i.e., enter by keyboard device 104) block coordinates directly into the edit field.

The dialog 311 also includes a Reverse Series button 317 and a Row/Column Swap button 318. The Reverse Series button instructs the system to plot the last series first, then move backward through the series order for plotting other series. This is particularly useful in 3-D bar and unstacked area graphs, for example, when a series with high values is plotted at the front of the graph, obscuring other series. The Row/Column Swap tool is provided for plotting columns as series when the system assigns series by rows, and plotting rows as series when the system would plot columns. Row/column swap also puts X-axis Series labels in the legend, and places Legend Series labels along the x-axis.

Figure 3C:
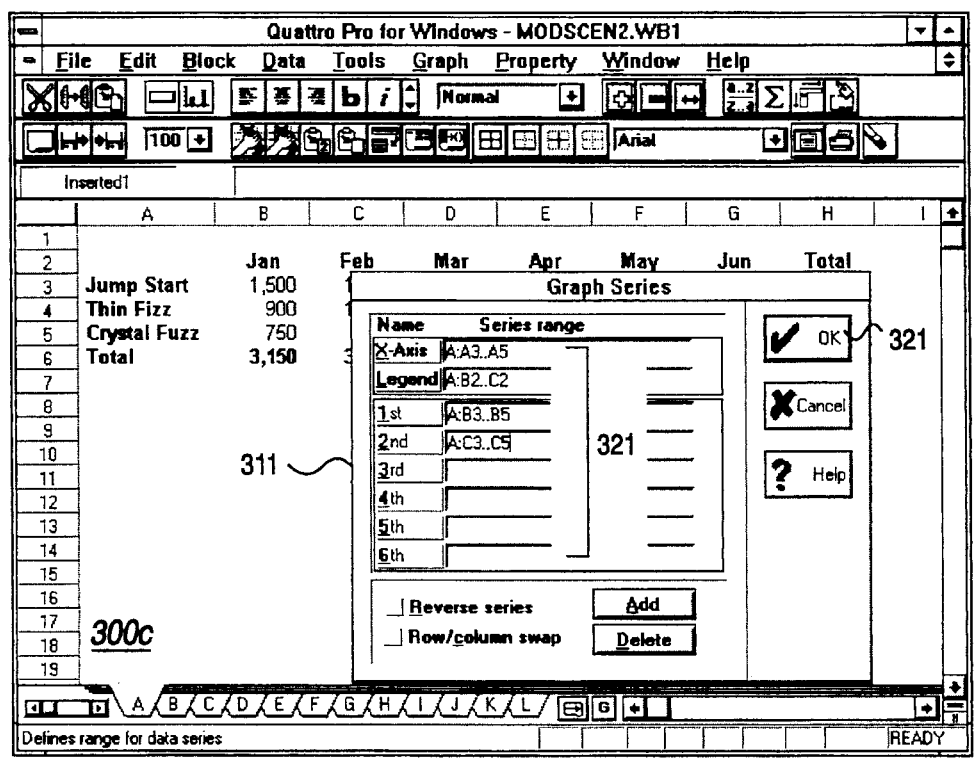
Figure 3D:
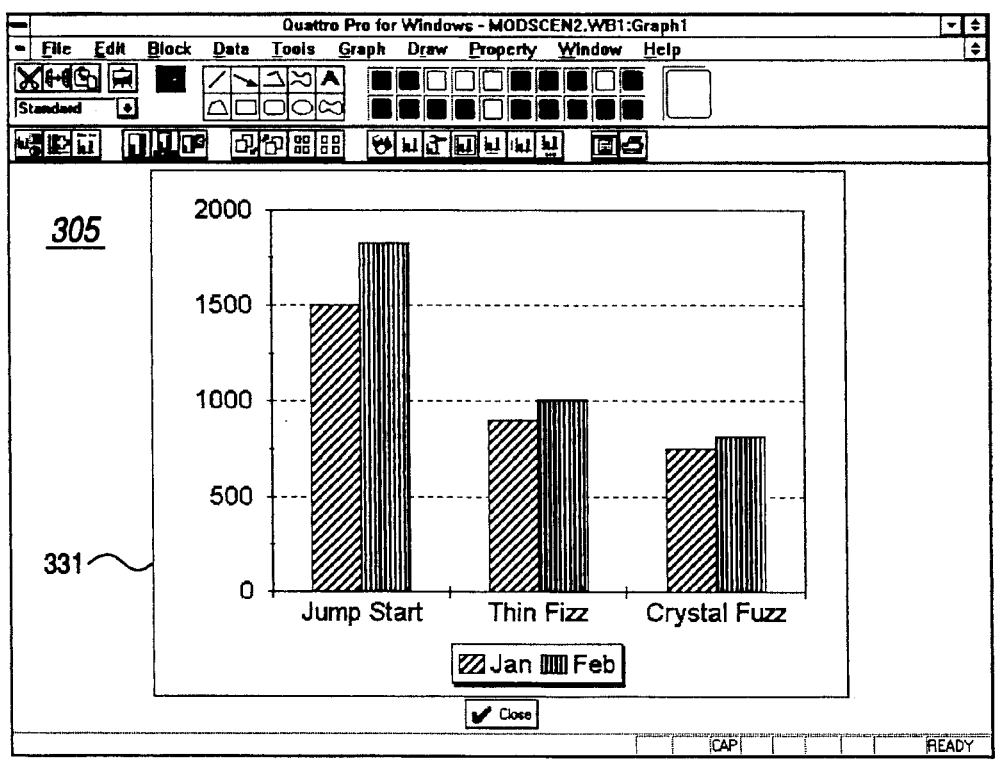

The dialog box 311, after the user-supplied criteria has been entered for the spreadsheet 300 (300*c*), appears as shown in FIG. 3C. The user confirms acceptance of the entries of the user criteria by selecting "OK" button 321. Upon confirmation, the system opens a graph window 305 displaying a bar graph 331 plotting the user's data, as shown in FIG. 3D. A bar graph is the default graph type for this standard mode. As described below, the system of the present invention includes improved methods for graphing which automatically select an appropriate graph type based on the user's own data.

2. Fast graph mode

Figure 4A:
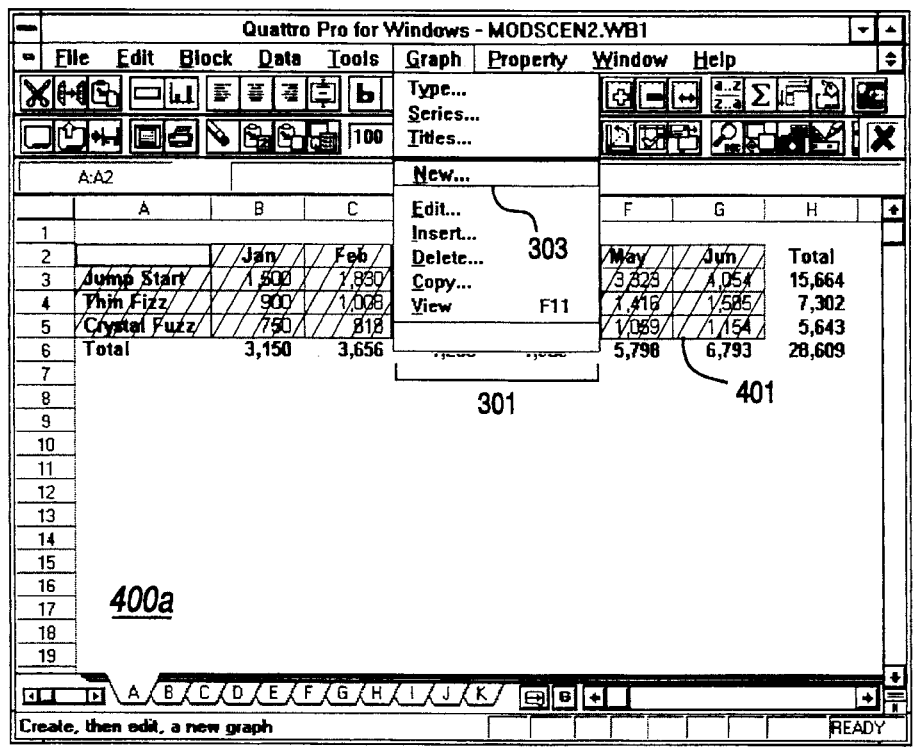
FIGS. 4A-B are screen bitmaps illustrating a second method and interface for graphing information in the system of the present invention.
Figure 4B:
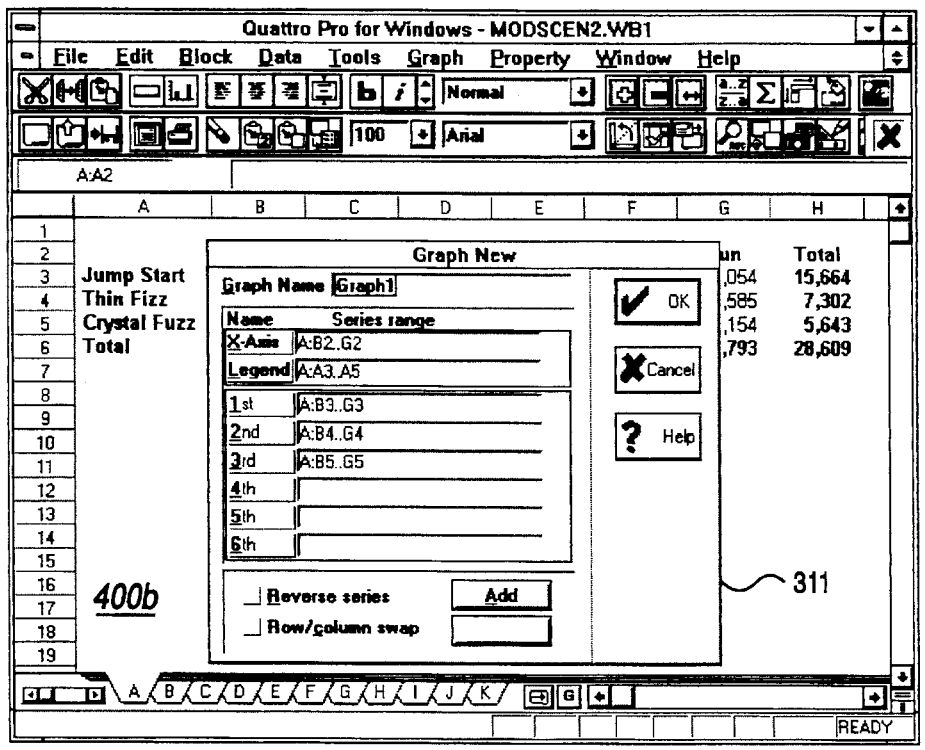

The system of the present invention includes a "fast graph" graphing method which automatically defines the series for the user. With reference to FIGS. 4A–B, the method proceeds as follows. The user selects the cells containing the data he or she wants plotted, including any explanatory labels. For spreadsheet 400 (400*a*) of FIG. 4A, for instance, the user has selected block 401, which comprises cells A2..G5. The cells selected may also comprise a non-contiguous block, if desired.

After selecting the desired cells, the user chooses the previously-described Graph!New command 303 from the Graph submenu 301. The system displays the Graph dialog box 311. As shown in FIG. 4B, the dialog 311 has the user-specified criteria already entered for the user-selected cells of spreadsheet 400 (400*b*); the system has automatically entered into the series edit fields appropriate cell references (addresses) selected from the block 401. At this point, the user need only check the series assignments to be sure the data is plotted in a desired fashion. If changes are desired, the user may edit the entries directly or employ Add, Delete, and Reverse Series buttons to change the series assignments. The default graph name can be accepted or a new one provided. Once satisfied with the entries, the user chooses "OK," whereupon the system closes the dialog and opens a graph window, such as the graph window 305 previously shown in FIG. 3D. The graph is plotted using the values from the dialog 311.

C. Creating a Floating Graph

Figure 5A:
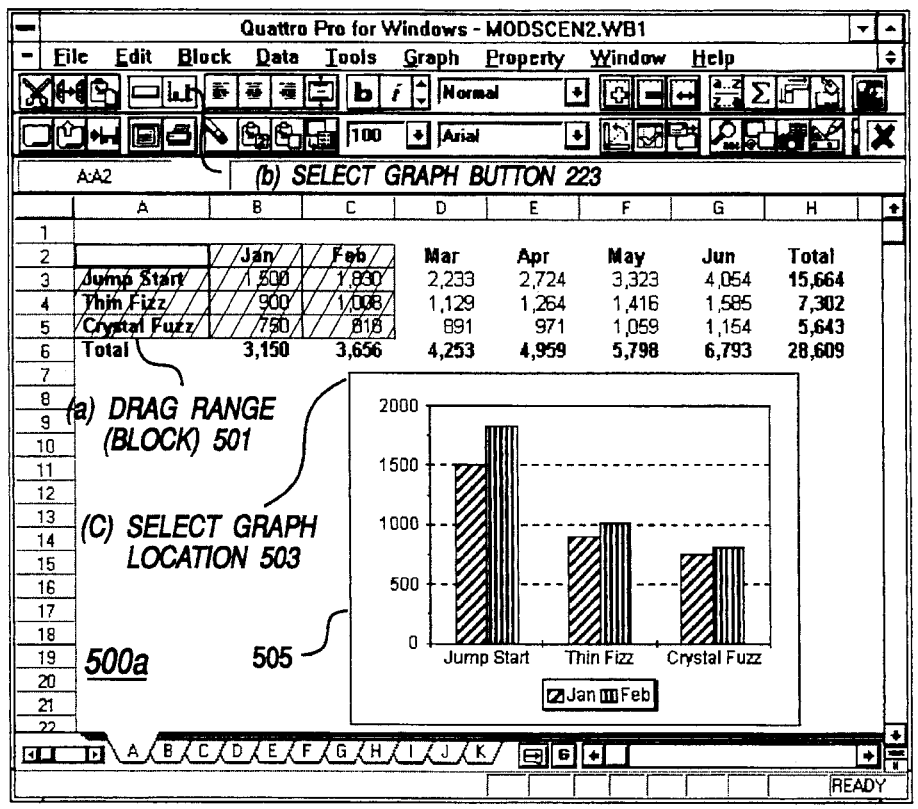
FIGS. 5A-C are screen bitmaps illustrating a third method and interface for graphing information in the system of the present invention.
Figure 5B:
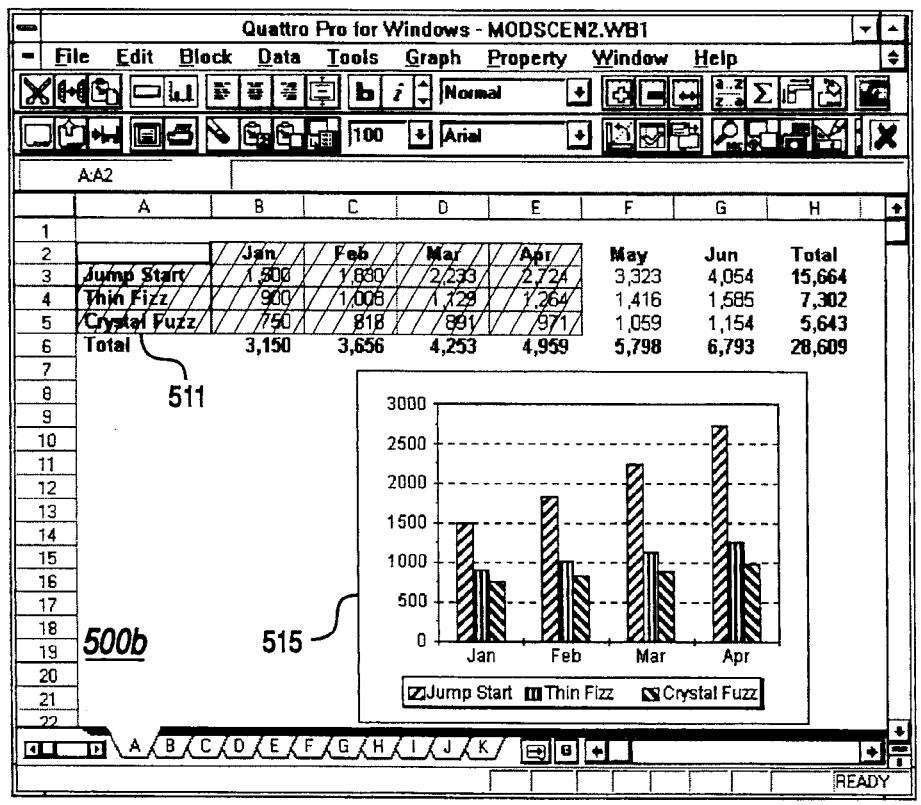
Figure 5C:
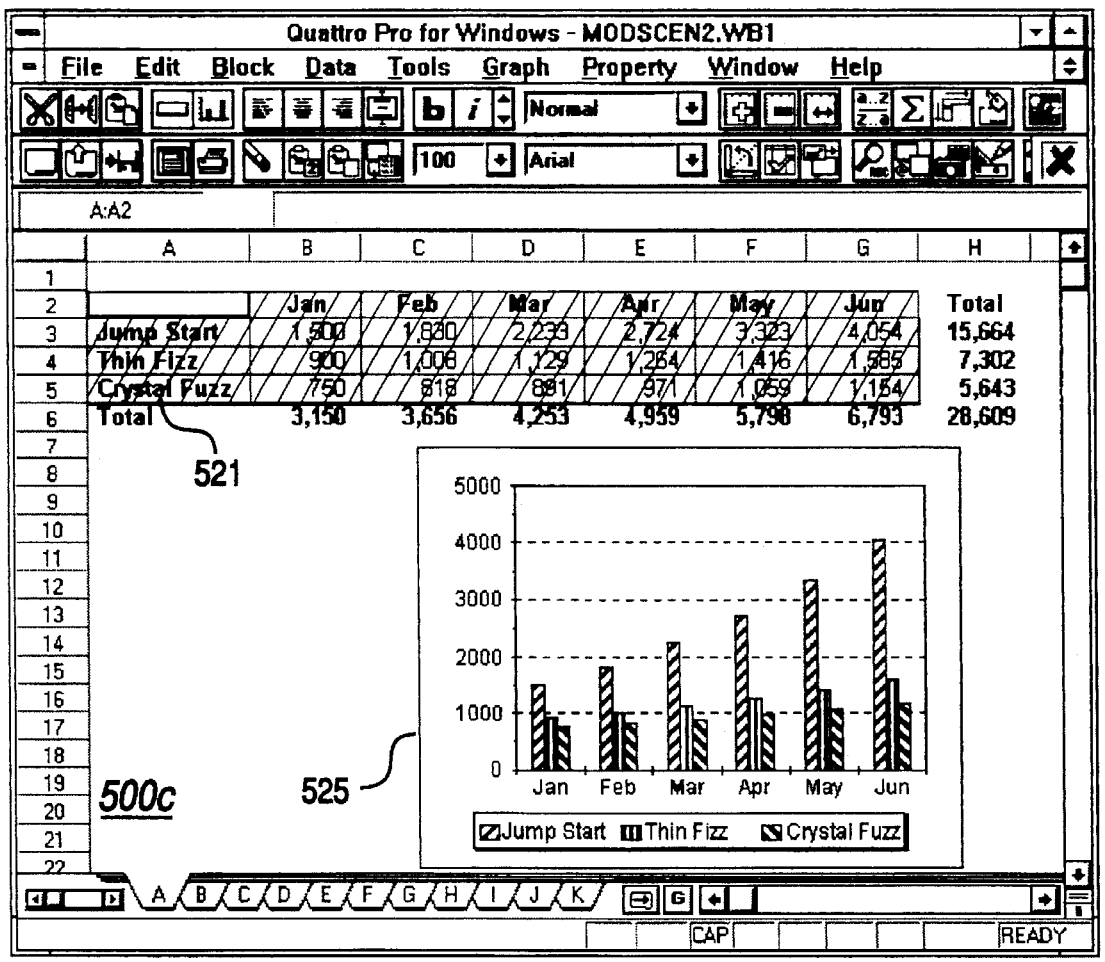

Referring now to FIGS. 5A–C, a method for creating a floating graph on a spreadsheet page will be illustrated. The user proceeds as follows. First, the user selects the block of data desired to be plotted, such as block 501 of spreadsheet 500 (500*a*) shown in FIG. 5A. Any surrounding cells which contain explanatory labels desired to be used as axis or legend labels are included in the block selection; in the example at hand, the user has included the Product Name and Month labels. Next, the user clicks (i.e., selects with the pointer) the Graph tool 223 from the toolbar 220; the screen cursor changes into a graph-shaped icon (not shown) for indicating the mode.

Finally, the user specifies a destination location 503 for the graph. This may be done by simply clicking at a desired location on the spreadsheet page. The system creates a floating graph 505 of a default size at the location clicked. Alternatively, the user may drag (select with the pointing device) an area of the spreadsheet page where the graph is desired to be placed; upon cessation of the drag operation (i.e., release of a mouse button), the system displays a floating bar graph in the specified area. As shown, the graph 505 has a default type of bar graph. Those skilled in the art will appreciate that the step of allowing the user to specify a destination for a graph is optional; the system could instead simply plot the graph at a free or at a default location. In a preferred embodiment, however, the user is preferably allowed to specify the graph's destination.

FIGS. 5B–C illustrate that other floating graphs may be quickly created in a like manner. In FIG. 5B, for instance, the user has selected data block 511 of the spreadsheet 500 (500*b*). After clicking the Graph tool 223 and a desired destination, the system displays graph 515. FIG. 5C illustrates the generated graph for user-selected data block 521 of the spreadsheet 500 (500*c*).

D. Customization of a graph

A graph created in a window can be readily converted into a floating graph. Upon selecting the Insert command from the Graph submenu 301, the user receives a list of graphs to include as a floating graph. The user selects a desired one and specifies a destination location in the spreadsheet page. A floating graph, on the other hand, can be readily displayed in a graph window by simply double-clicking the graph (or invoking a Graph!Edit command from the main menu 210). Floating graphs are updated automatically as the graph in a graph window is modified.

The graph window includes tools specific for modifying graphs; also, the user can right-click any part of the graph to bring up an object-specific menu for changing properties (as described in assignee's U.S. patent application Ser. No. 07/866,658). The user can also instruct the system to print the graph separately from the spreadsheet page, display the graph in a slide show, and insert the graph on another spreadsheet as a floating graph. Other graph properties may be changed in the graph window or from the main menu (for a floating graph). The Graph!Title command is used, for instance, to add a graph title, subtitle, and axis titles to the graph. The Graph!Series command, on the other hand, is used to change the way series are plotted.

Of particular interest is the property of graph type. While a bar graph type is provided by default for the above-described methods, the system of the present invention actually provides many different types of 2-D and 3-D graphs. 2-D graphs (with the exception of pie, doughnut, and column graphs) position data relative to a horizontal or x-axis and a vertical or y-axis. The horizontal or x-axis shows progression of values and often represents time (days, weeks, quarters, and so on). The vertical or y-axis scales values; it serves as reference points for the placement of bars, lines, and markers on the graph, as determined by the data plotted in the graph. XY graphs (often called scatter diagrams) plot values against two numeric scales. The x-axis scale is determined by the values in the x-axis series. The y-axis scale is determined by the values in all the other series. 2-D pie, doughnut, and column graphs do not have axes at all. Pie and doughnut graphs illustrate the values of a single series as slices in a circular whole. Column graphs also illustrate only a single series, and show values as sections of a column. In a preferred embodiment, the following 2-D graph types are available: Bar Graphs, Line Graphs, Area Graphs, Pie and Column Graphs, Doughnut Graphs, XY Graphs, High-Low Graphs, and Radar Graphs.

3-D graphs typically plot multiple series against a background of two walls and a base (again with the exception of pie, doughnut, and column graphs). The first series is by default plotted at the front of the graph, from left to right. Successive series are drawn, in order, behind the first. Legend labels appear along the z-axis in most 3-D graphs. The system offers the following 3-D graph types: Bar Graphs, Line (Ribbon) Graphs, Area Graphs, Pie and Column Graphs, Doughnut Graphs, and Surface Graphs.

The graph best suited for plotting a user's data will vary, to a large extent, on the type of data the user has. The following graphs, for example, are suited to the following data:

Bar graphs compare values of different items at specific points in time—to contrast monthly commissions for each sales representative, for example.

Line graphs show the progression of values over time—to track sales, for example.

Area graphs show the relationship of each value to the total over time—how each sales representative contributed to total sales over a 12 month period, for example.

Stacked bar graphs show the relationship of each value to the total—how total sales are divided between regions, for example. 100% stacked bar graphs show the percentage each series contributes to the total.

Comparison graphs have lines connecting the boundaries between series. This makes it easier to compare series values or proportions from one bar to the next.

Pie graphs compare individual values to other values and to the whole—how yearly expenses break down into categories, for example. These are used to focus on the individual values in a single series.

Doughnut graphs like pie and column graphs, plot a single series with each value plotted as a percentage of the whole. One can add text or graphics to the interior "hole" with graph window drawing tools.

XY graphs plot values in one series against those in another—to show the relationship between salary and length of employment, for example.

High-low graphs illustrate the difference between corresponding values in two series. Though most often used in tracking daily stock prices, high-low graphs can be used whenever one wants to compare the difference between pairs of values.

Surface graphs plot rows and columns as intersecting lines on a surface that is suspended in a 3-D frame. Surface graphs are useful for plotting functions such as f(x) and f(x,y), and parametric curves (x(t), yt(t)).

Radar graphs show x-axis values as lines radiating from a common center, like spokes of a wheel, with y-axis values plotted on each "spoke." These are useful for highlighting trends, depending on the shapes drawn by the plot lines, or simplifying series comparisons.

Text graphs show drawings and text instead of values. These are useful for slide shows and view graph presentations.

As will be appreciated, the system includes numerous graph types for representing one's data. The system provides a Graph!Type command for selecting a graph type. To assist the user in selecting a graph type which best represents one's data, the system of the present invention provides the automated formatting module 136 which will now be demonstrated.

E. Automated selection of graph type

Referring now to FIGS. 6A–H, an improved fast graph method of the present invention for graphing spreadsheet information will be described. The method includes automatic selection of a graph type based on a user's particular data.

Figure 6A:
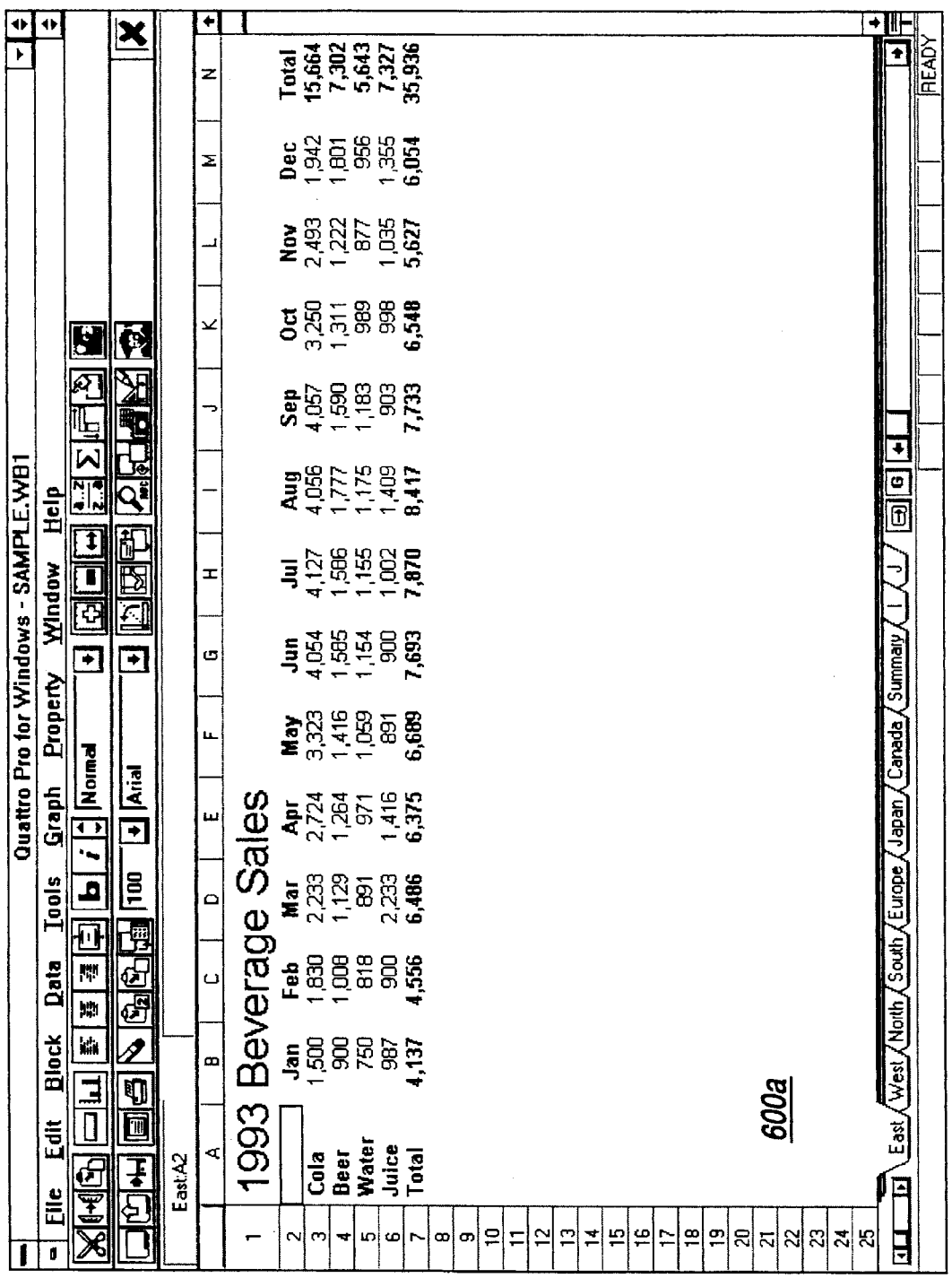
FIGS. 6A-H are screen bitmaps illustrating a fourth, most-preferred method and interface for graphing information in the system of the present invention.
Figure 6B:
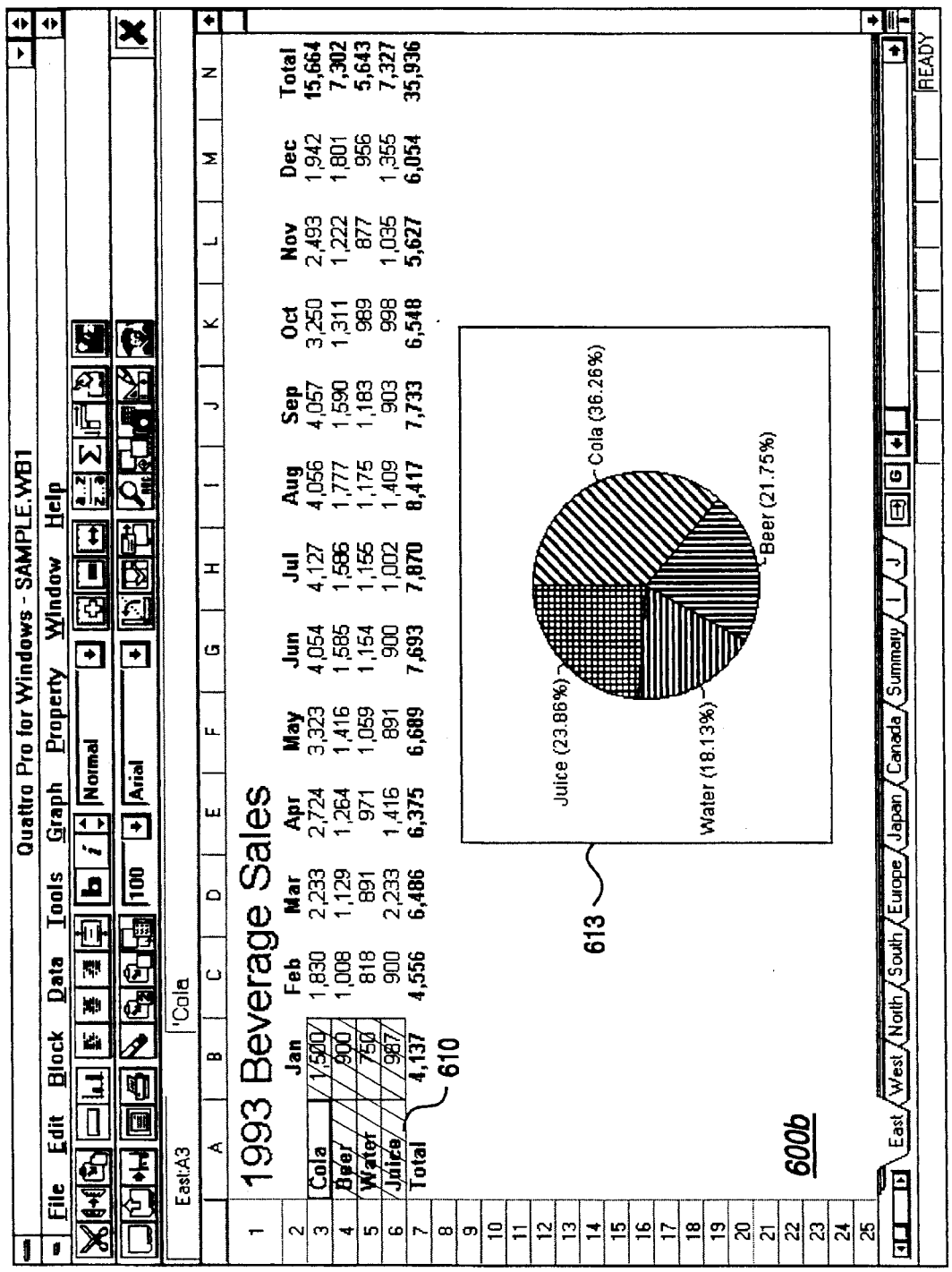

FIG. 6A shows a sample spreadsheet 600*a*, representing beverage sales for a fictitious company. The spreadsheet comprises sales figures for various product lines (Cola, Beer, Water, and Juice) by month. Suppose, for instance, the user desires a breakdown of sales of the various beverages for the month of January. The user need only select data block 610, click the graph tool 223, and then select a destination on the spreadsheet 600 (600*b*), as shown in FIG. 6B. In response, the system automatically constructs and displays the pie graph 613, which graphically demonstrates the breakdown of sales by product line for the selected data.

Figure 6C:
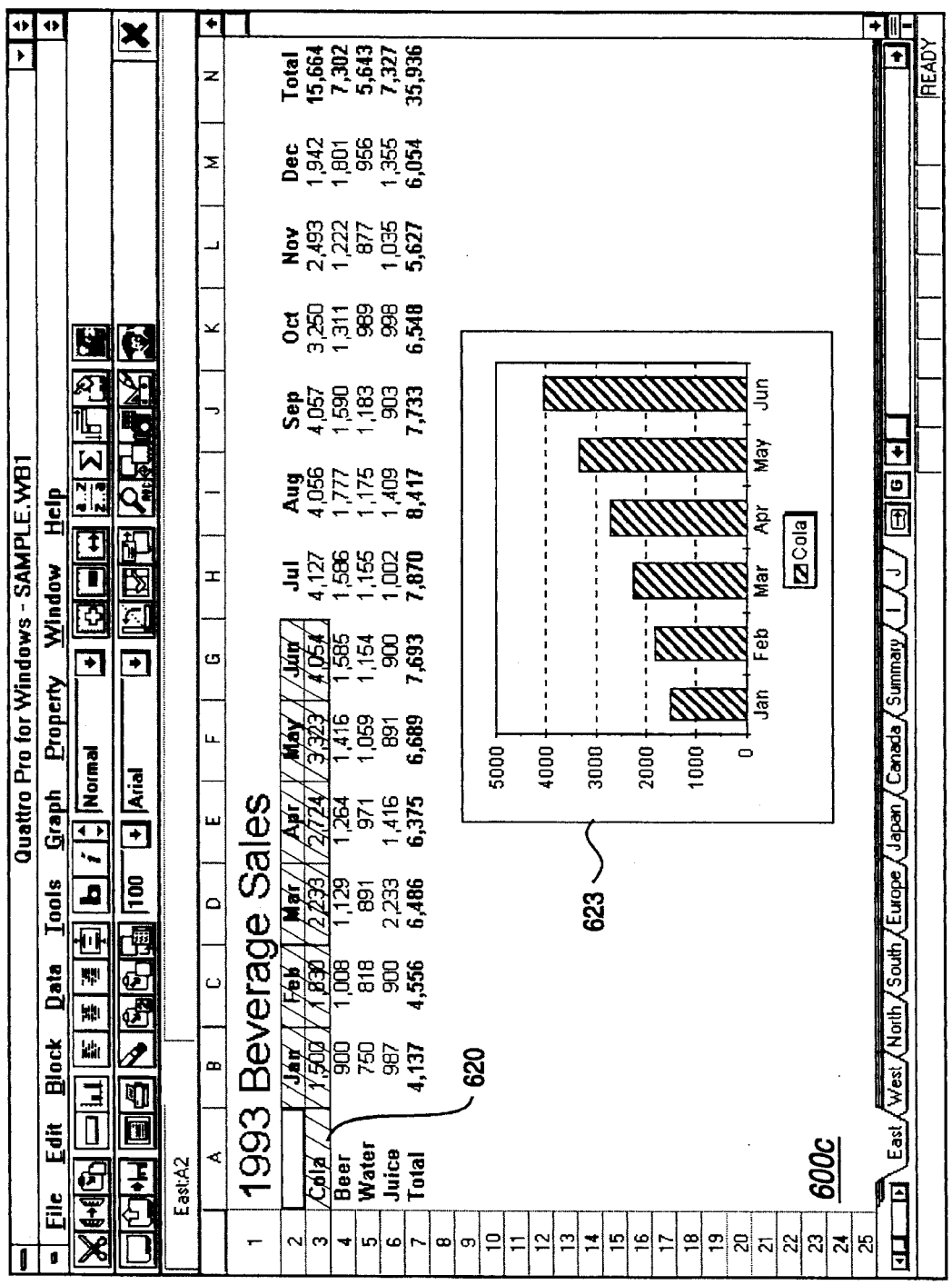

Suppose, on the other hand, that the user is interested in the sales of a particular product over a period of time. As shown in FIG. 6C, for example, the user may select block 620, click the graph tool 223, and select a destination for quickly generating bar graph 623. As shown, the system has automatically selected the months (January-June) as labels for the horizontal or X-axis.

Figure 6D:
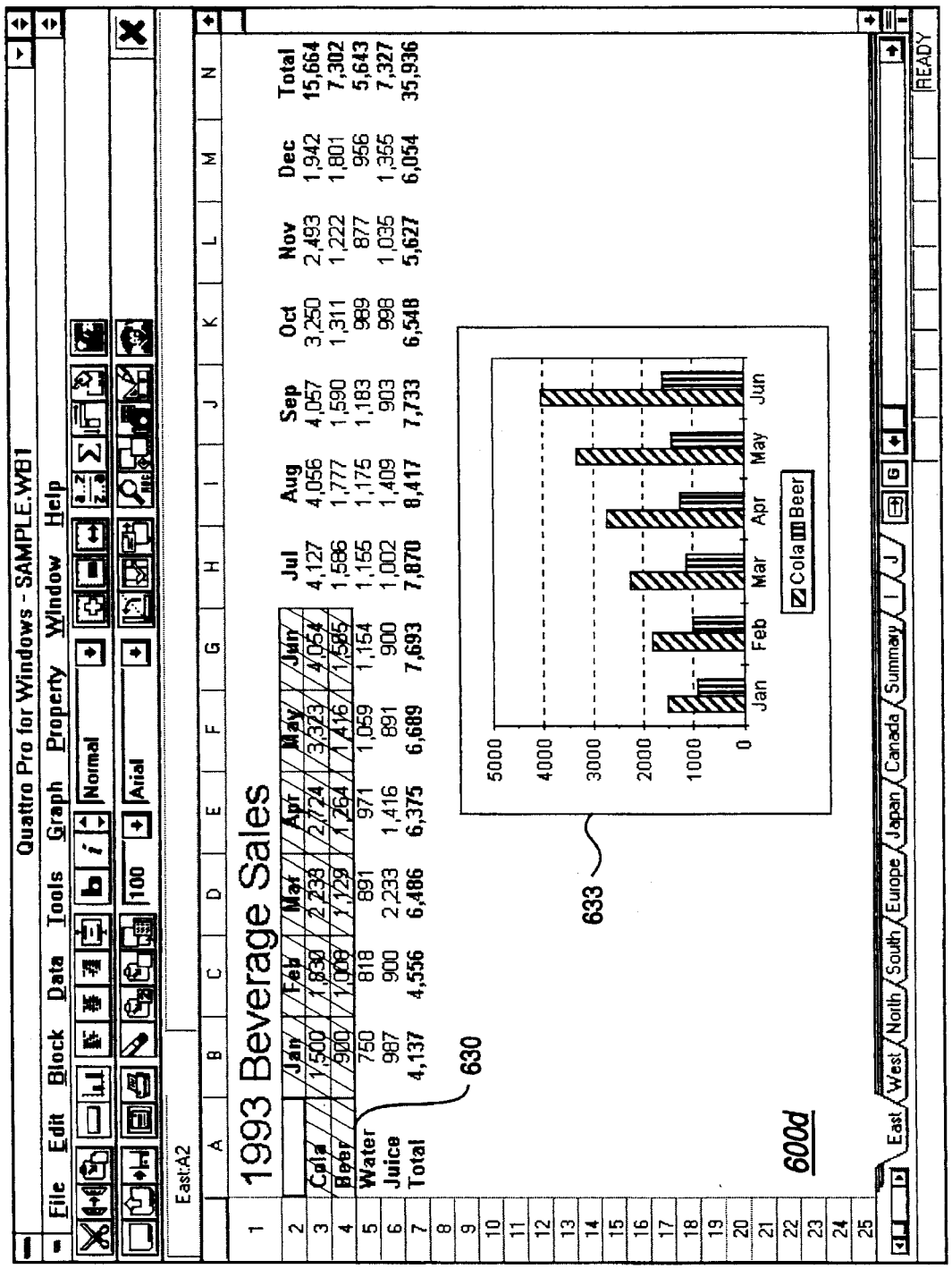

FIG. 6D illustrates that the data block 620 may be extended to include sales for the Beer product line, as shown by block 630. After the user invokes the graph tool 223 and selects a destination, the system creates and displays bar graph 633, which allows the user to readily discern sales performance between the Cola and Beer product lines.

Figure 6E:
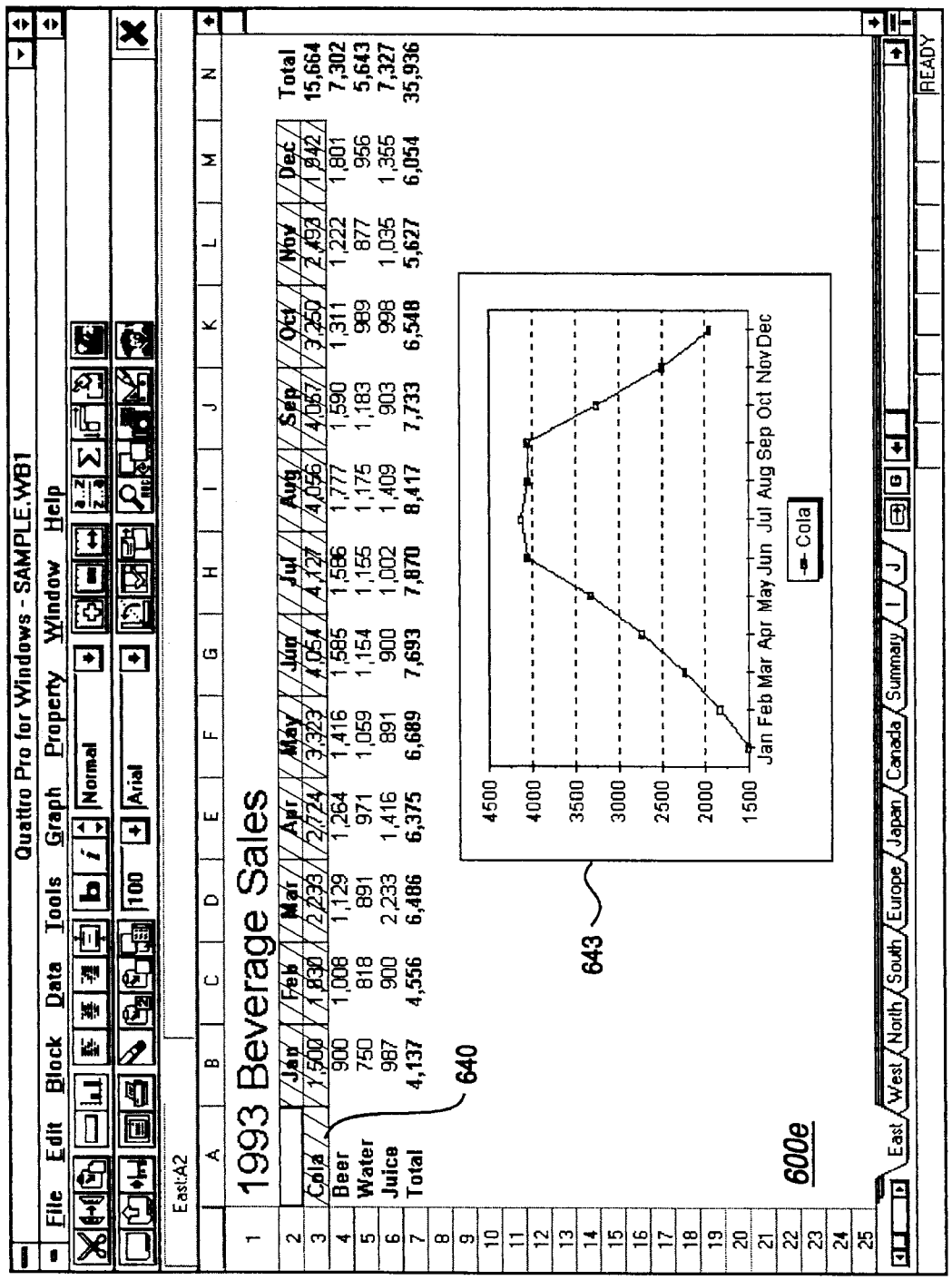

As the complexity of the user-selected data increases, the system adjusts the type of graph to best illustrate that complexity. In FIG. 6E, for example, the user has selected sales information for the Cola product line for the entire year. In contrast to the other user-selected blocks (i.e., block 610, 620, and 630), the selected block 640 includes numerous (e.g., greater than 10) data points. For instance, the sales data spans cells B3..M3—a total of twelve data points. Recognizing the additional data points in the user-selected block, the system automatically adjusts the graph type to one which better illustrates multiple data points (e.g., line graph). Thus, upon the user selecting block 640, clicking Graph tool 223, and specifying a destination, the system automatically creates and displays the line graph 643.

Figure 6F:
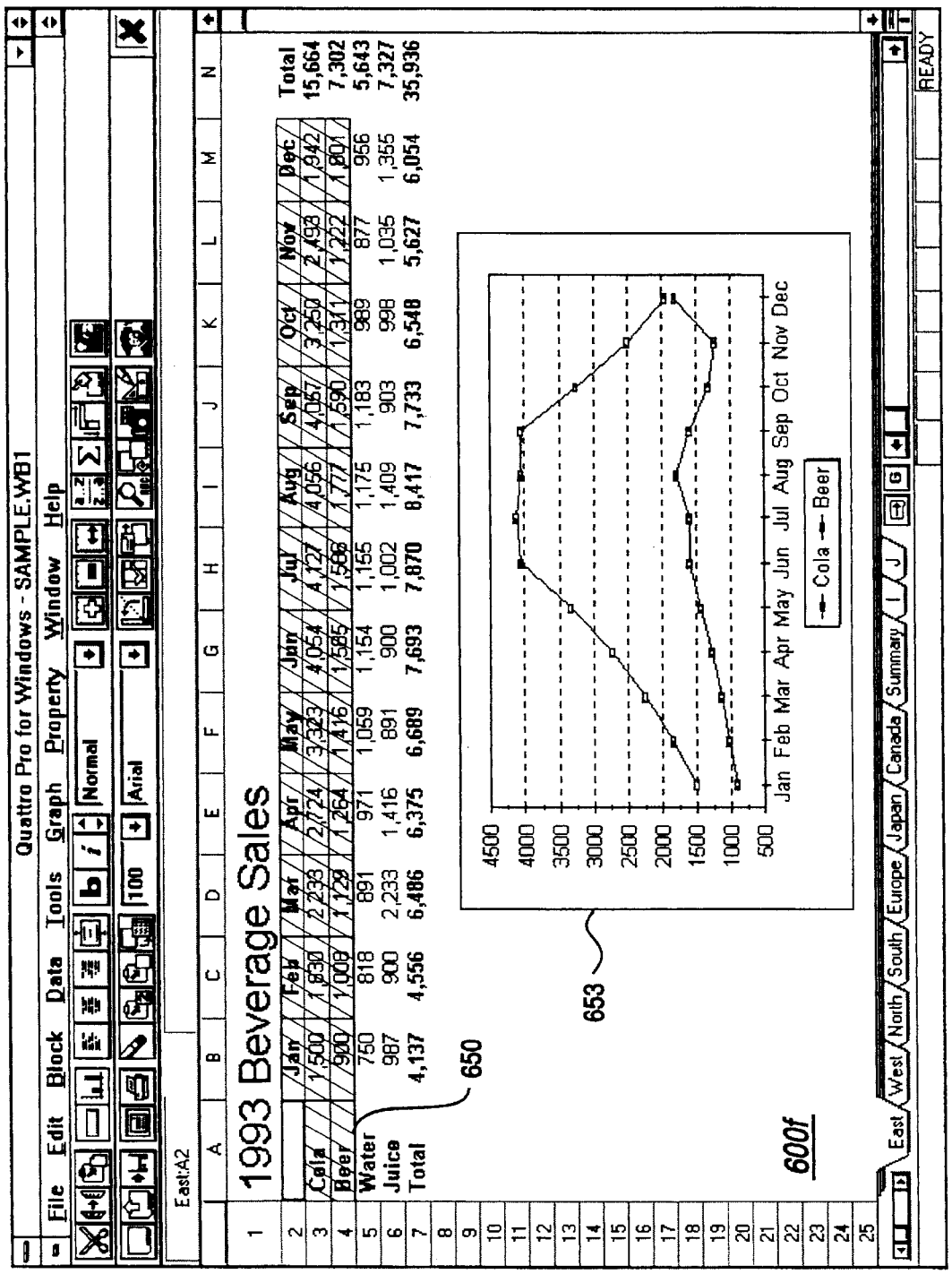

As is shown in FIG. 6F, the data block 640 (of FIG. 6E) may be extended to include an additional data series (e.g., Beer sales information), as shown by block 650. Upon the user clicking the graph tool 223 and specifying a destination, the system constructs and displays multi-line graph 653, which illustrates comparative sales information for the Cola and Beer product lines.

Figure 6G:
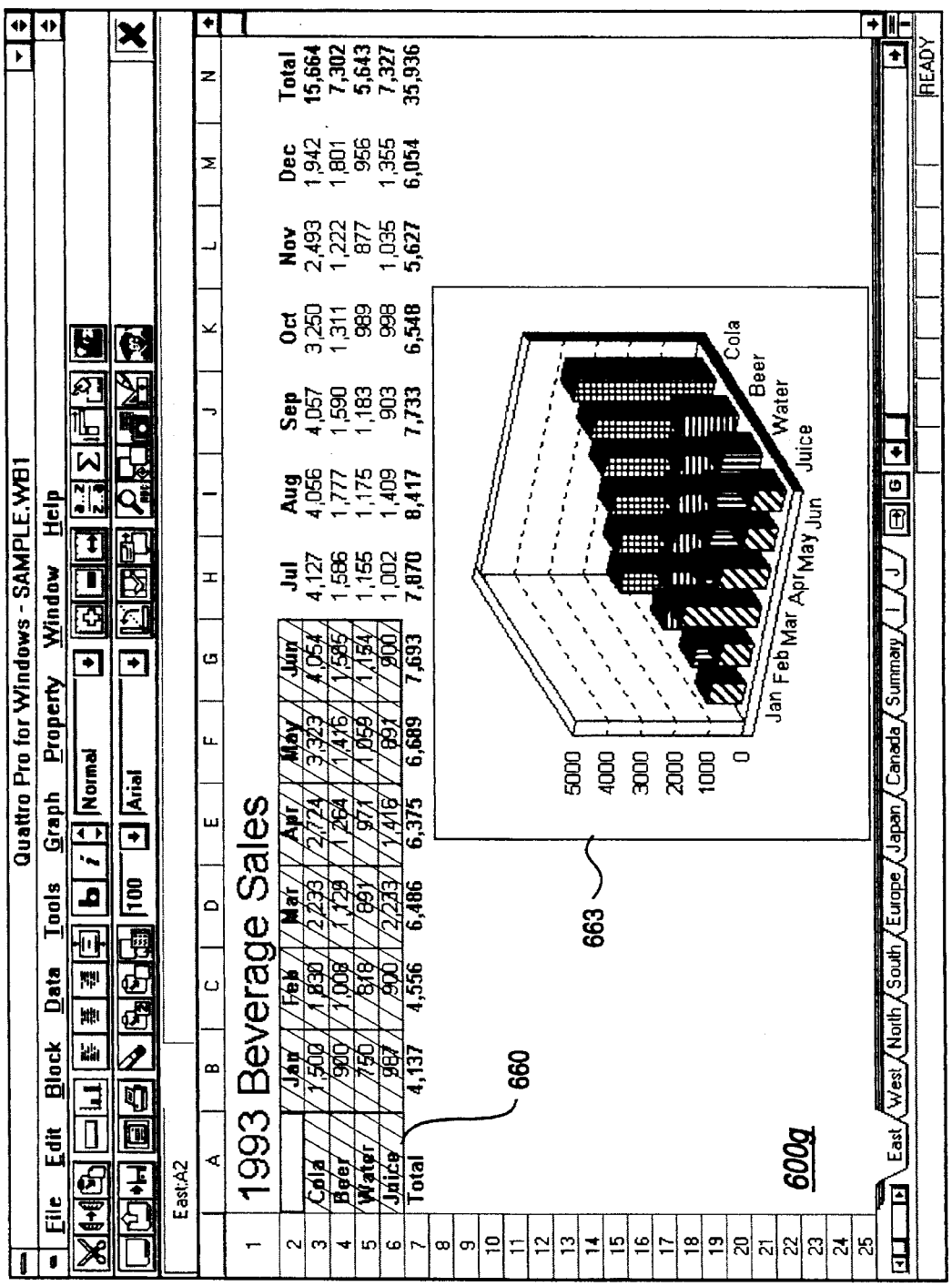

The foregoing examples of FIGS. 6B–F have been limited to user data sets or blocks having only one or two data series. As the number of series which comprise a data block increases, the system of the present invention adjusts the dimensionality of graph type to better illustrate the additional series. In particular, the system recognizes the additional series and switches to graph types which are 3-D. As shown in FIG. 6G, for instance, the user has selected a data block 660 having multiple data series (i.e., Cola, Beer, Water, and Juice). Upon the user's invocation of the Graph tool 223 and selection of a destination, the system automatically creates and displays a 3-D bar graph 663.

Figure 6H:
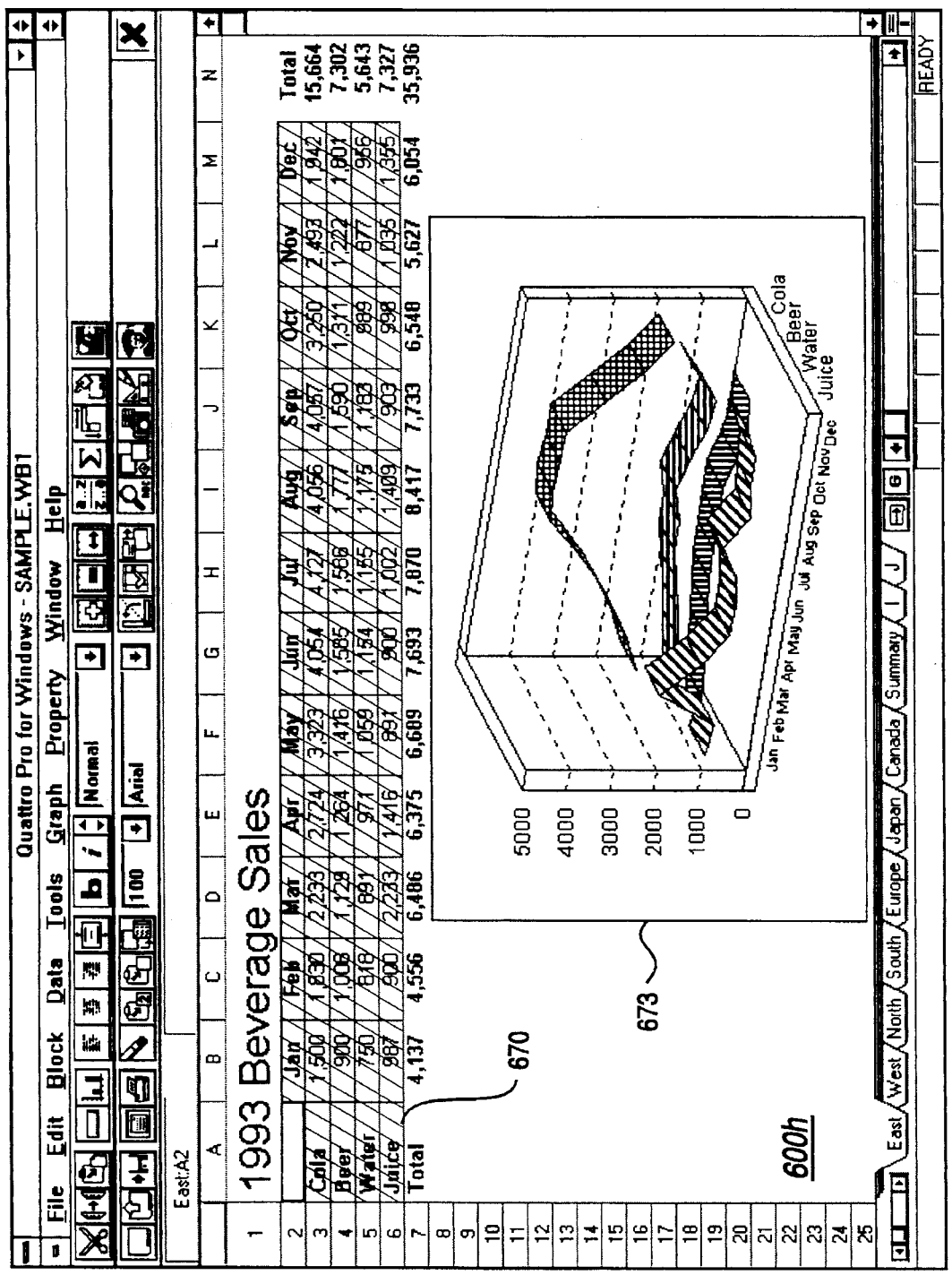

Continuing on to FIG. 6H, the complexity of the user-selected block continues to increase, as the user has selected block 670—sales information for all products for the entire year. Upon selection of the graph tool 223 and a destination by the user, the system automatically creates and displays a 3-D ribbon graph 673. Although not illustrated in the drawings, had the user selected an even more complex data set, e.g., five or more series and twenty or more data points), the system would select a 3-D surface graph.

Internal operation

Figure 7A:
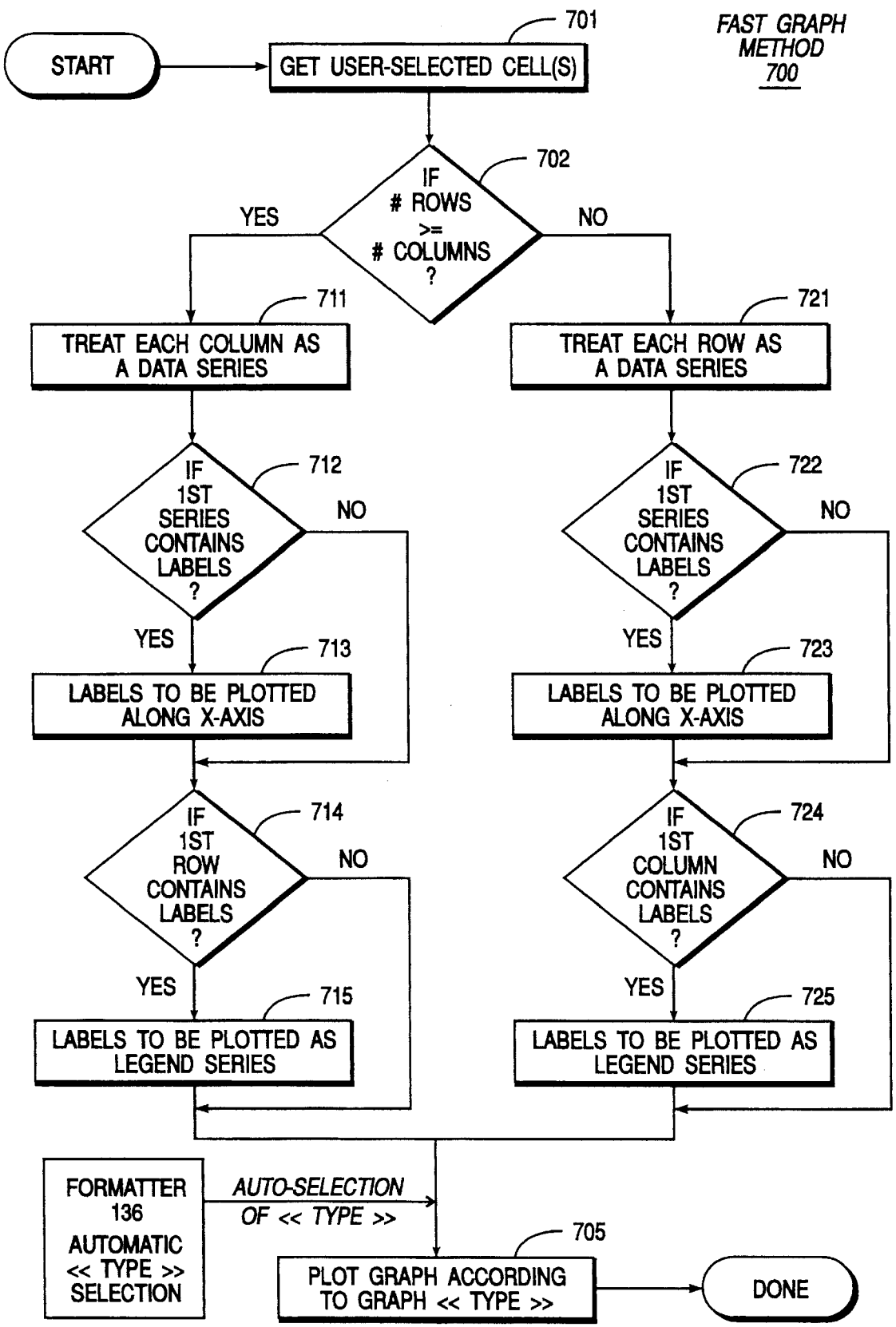
FIG. 7A is a flowchart illustrating a method of the present invention for graphing one's data with the graphing module in the system of the present invention, the method providing for automatic selection of graph type based on the user's own data set (e.g., block of cells).

Referring now to FIG. 7A, a preferred method 700 of the present invention for automatically graphing user-selected information will now be described. At step 701, a block (contiguous or non-contiguous) of cells is specified by the user. As previously described, the system of the present invention provides a preferred interface for receiving a user-specified block of cells (typically, entered via pointing device and/or keyboard input). Next, the system determines how to plot the data in the user-specified block. How the data are plotted depends on the dimensions and contents of the block selected by the user before the graph is created. The data are analyzed as follows. If the number of rows in the user-specified block is greater than or equal to the number of columns at step 702, then the method will proceed down the left-hand path to step 711 to treat each column as a data series. Although not shown as a step, the method may discard at this point any series which is blank (empty) or all zero. After step 11, if the first series to be plotted contains labels (i.e., alphanumeric text), then the method treats this first series as labels to be plotted along the horizontal or X-axis at step 713. If the first series does not contain labels, then step 713 is skipped. At step 714, if the first row contains labels, then the labels are to be plotted as a legend series (described above) at step 715. Otherwise (no at step 714), step 715 is skipped.

If at step 702 the number of columns is greater than the number of rows, then the method 700 proceeds down the right-hand path (steps 721–725) as follows. At step 721, each row is treated as a data series to be plotted. As described above, the method may discard at this point any series which is blank (empty) or all zero. If the first series contains labels at step 722, then at step 723 the labels are to be plotted along the horizontal or X-axis. If the first series does not contain labels (no at step 722), however, then step 723 is skipped. At step 724, if the first column contains labels, then the method proceeds to step 725 to employ the labels as a legend series. If the first column does not contain labels (no at step 724), however, then step 725 is skipped.

At the conclusion of either step 715 or 725, the method proceeds to step 705 to plot a graph according to the determined series (or user-specified ones) Before the graph is actually plotted, however, the formatter 136 is preferably invoked to further examine the content of the user-specified block for selecting a graph type which best illustrates the user's data. The method may proceed directly to plot the system-selected graph type, as above; alternatively, a dialog may be displayed which allows the user the accept the graph type (or select among acceptable graph types) before the graph is plotted. The operation of the formatter 136 will now be described in greater detail with reference to FIGS. 7B–C.

Figure 7B:
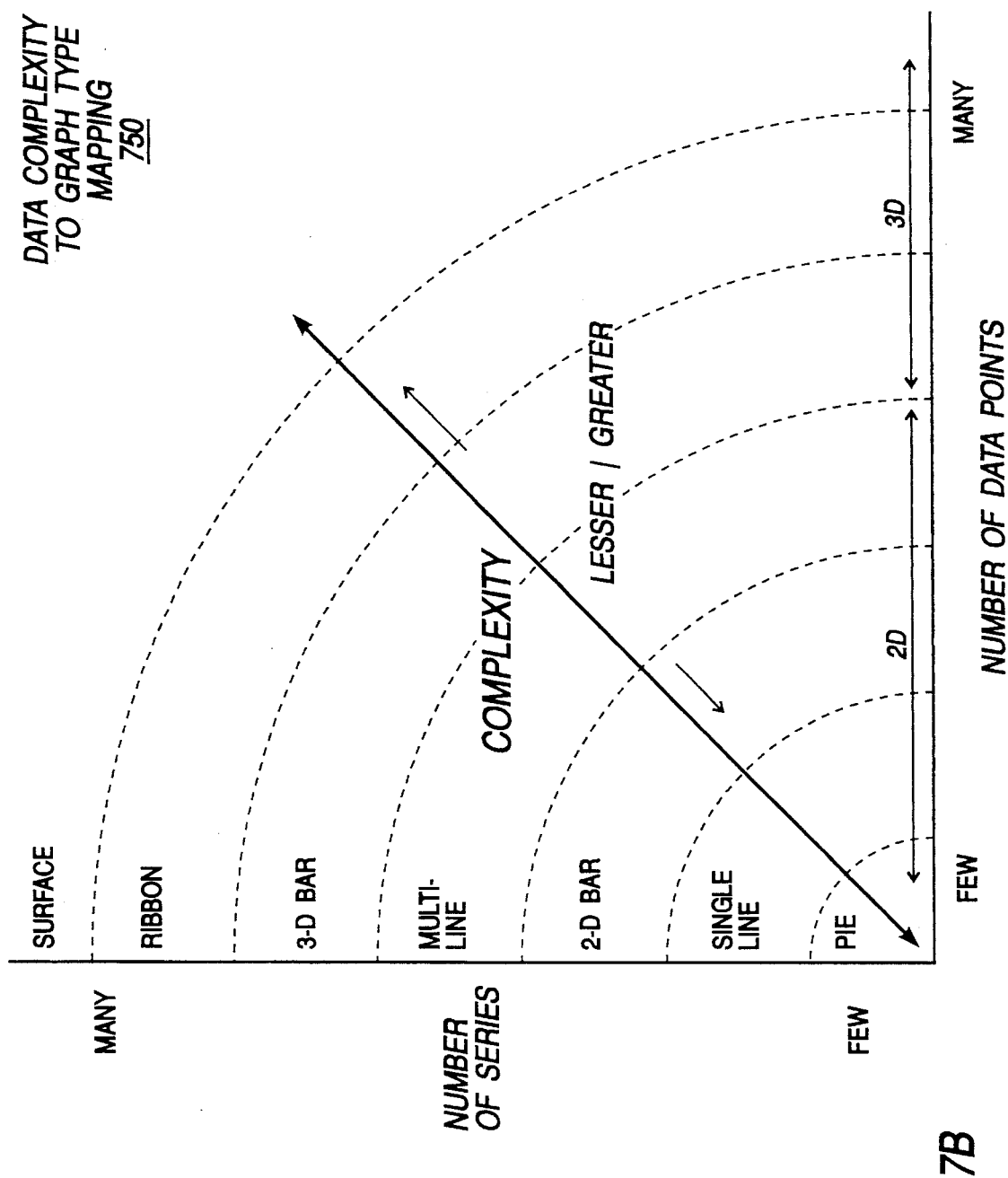
FIG. 7B is a graph illustrating the relationship between complexity of a user's data set and varying levels of complexity of available graph types.

FIG. 7B is a diagram illustrating varying levels of complexity which may be present in user-specified information. For instance, a user-specified block having relatively few data series (e.g., one) and relatively few data points within those series (e.g., three) is a comparatively simple data set. An example of such a data set is the block 610 of FIG. 6B. On the other hand, a user-specified block of information may be fairly complex—one having multiple data series and numerous data points within each of those series. Such a data block is the block 670 of FIG. 6H. As shown by the complexity graph 750, therefore, the complexity of a data set may be mapped into various graph types, ranging from simple ones (e.g., 2-D pie graph) to complex ones (e.g., 3-D surface graph).

Figure 7C:
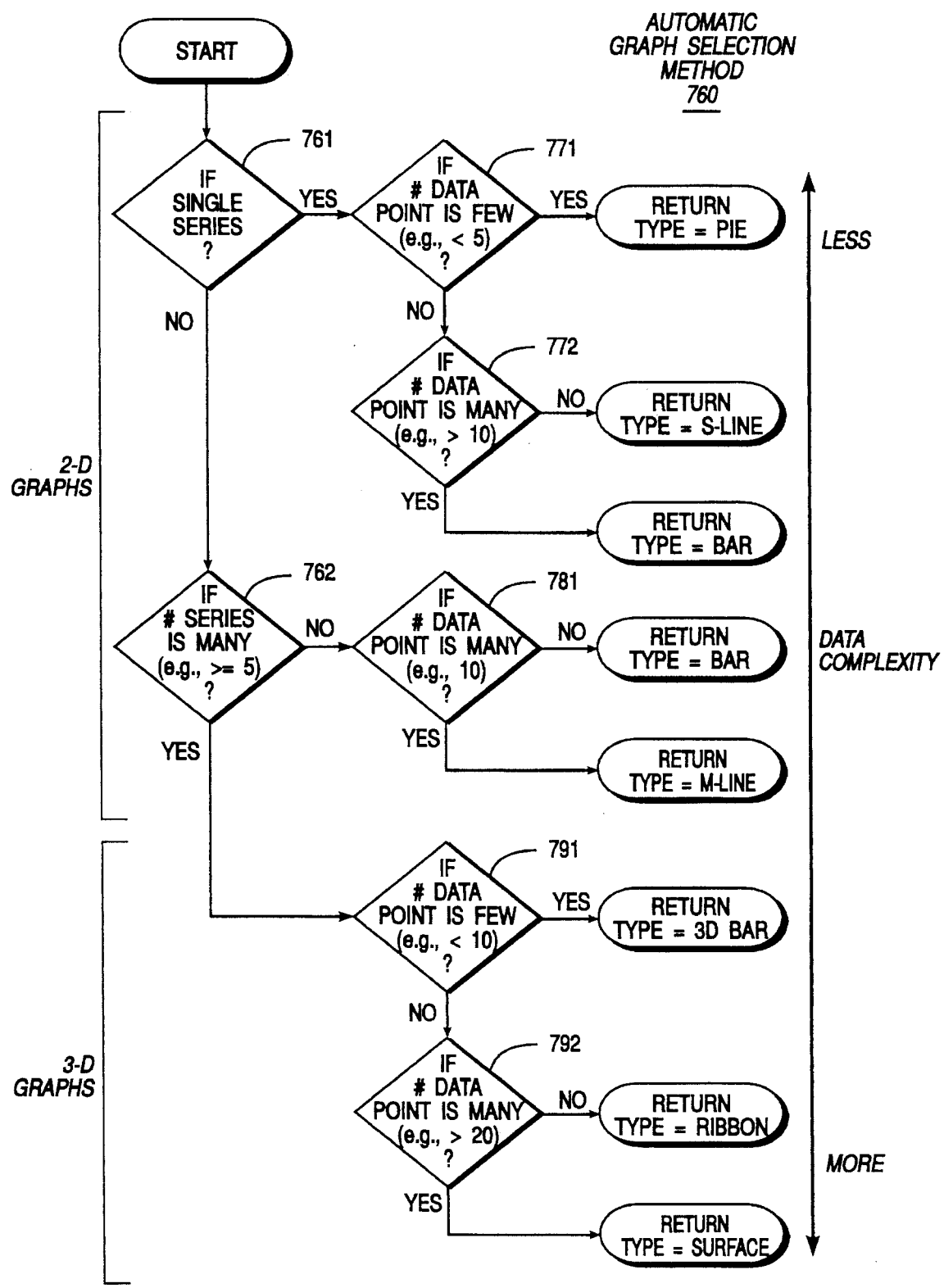
FIG. 7C is a flowchart illustrating a method for automatically selecting a graph type based on one's own data; the method may be invoked by other methods (e.g., invoked as a submethod by the method 700 of FIG. 7A).

Referring now to FIG. 7C, an exemplary method 760 of the present invention for determining the complexity of a data set and selecting a graph type based on the determined complexity is illustrated. In a preferred embodiment, the method is invoked as a submethod of the method 700 (e.g., before step 705).

The following description will focus on a particular embodiment of the method which determines the complexity of the user's own data, based on the layout and content of that data. The preferred embodiment employs successive filtering (conditional logic) for making this determination. Alternatively, the method may be modified to give a score or weighting to the user's data, based on its contents and layout. The system of the present invention may also make further determinations about the data types (e.g., from among fixed, scientific, currency, percent, date, time, text, and user-defined data types) for the information selected by the user. For instance, the system may determine that a data series includes members which are temporally related (i.e., varying over a period of time); accordingly, the system may select a graph type which best illustrates temporal information (e.g., "line" graph, but not "pie" graph). Those skilled in the art will appreciate that data types (e.g., date, currency, percent, floating point, integer, and the like) may be readily determined from internal data representation and/or format settings for the information of interest. Also, heuristic information about data types (e.g., a particular range of integers representing 20th century dates) may be provided using known expert system technique, typically in the form of an inference engine with one or more knowledgebases. The following embodiment is computationally frugal, allowing automatic graph selection with minimal penalty in system performance, and at the same time yields excellent results; it is therefore the most preferred embodiment.

The graph selection method 760 proceeds as follows. At step 761, if the user-selected block includes just a single data series, the method proceeds to step 771. At step 771, if the number of data points in this single series is few (e.g., less than five), then the method returns a graph type of "pie." Otherwise (no at step 771), the method proceeds to step 772 to determine if the single series includes many data points (e.g., greater than ten). If many data points are present (yes at step 772), then the method returns a graph type of "bar." Otherwise (no at step 772), the single series includes about five to ten data points; a graph type of "line" (single line) is returned as the preferred type.

If more than a single data series is present (no at step 761), then the method proceeds to step 762 to determine if many (e.g., greater than or equal to four or five) data series are present. If not, then the user-selected block includes a moderate number of data series; the method proceeds to step 781. At that step, the method determines if many (e.g., ten) data points are present. If not (no at step 781), the method returns a graph type of "bar." Otherwise (yes at step 781), many data points are present; these are best represented by selecting a graph type of "line" (a multi-line graph, as the user-specified block has more than one data series).

Up to this point, the system of the present invention has selected among 2-D graph types. If, at step 62, many data series are present, then the method proceeds to step 791 to select among 3-D graph types. At step 791, if the number of data points present is relatively few (e.g., less than ten), then the method returns a graph type of "3-D bar." Otherwise (no at step 791), the method proceeds to step 792 to determine if many (e.g., greater than twenty) data points are present. If many data points are not present (i.e., data points present number from about ten to twenty), then the method returns a graph type of "ribbon." If many data points are present, however, the method will return a graph type of "surface."

While the invention is described in some detail with specific reference to a single preferred embodiment and certain alternatives, there is no intent to limit the invention to that particular embodiment or those specific alternatives. For example, although the foregoing description includes exemplary values employed and includes particular preferred graph types for a given level of data complexity, those skilled in the art will appreciate that other variations may exist in accordance with the principles of the present invention. Moreover, other parameters of complexity, such as whether the user information includes scientific or business data, may be measured for automatically selecting a graph type. By examining the data type of the members of the data series (e.g., fixed, scientific, currency, percent, date, time, text, and user-defined data types), the system may make further determinations as to which graph type is most appropriate for the task at hand. Thus, the true scope of the present invention is not limited to any one of the foregoing exemplary embodiments but is instead defined by the following claims.

What is claimed is:

1. In a computer system, a computer-implemented method for assisting a user with graphing information, the method comprising:

(a) providing a variety of graph types for presenting different types of user data sets;

(b) receiving as input one of said user data set, said data set including information cells storing information desired by the user to be plotted as a graph;

(c) examining the data set for determining layout and data types of the information cells for the data set;

(d) selecting a graph type based on said determined layout and data types of the information cells for the data set; and (e) plotting said graph with said information of said information cells, said graph having a type of said selected graph type.

\* \* \* \* \*